Nov. 27, 1962 R. S. KAMPF 3,066,299

RECORDER

Filed Sept. 8, 1958 17 Sheets-Sheet 1

INVENTOR.
RICHARD S. KAMPF

BY Arthur H. Swenson

ATTORNEY.

Nov. 27, 1962  R. S. KAMPF  3,066,299

RECORDER

Filed Sept. 8, 1958  17 Sheets-Sheet 2

INVENTOR.
RICHARD S. KAMPF

BY Arthur H. Swanson

ATTORNEY.

Nov. 27, 1962 R. S. KAMPF 3,066,299

RECORDER

Filed Sept. 8, 1958 17 Sheets-Sheet 3

INVENTOR.
RICHARD S. KAMPF

BY Arthur H. Swanson

ATTORNEY.

INVENTOR.
RICHARD S. KAMPF
BY Arthur H. Swanson
ATTORNEY.

TABLE

| RANGE | CLUTCH |
|---|---|
| .1 | – |
| 1 | 365 |
| 10 | 3L4 |
| SPEEDS IN. PER SEC. | |
| 1 | – |
| 2 | 3L1 |
| 4 | 3L3 |
| 8 | 3L1-3L3 |
| 16 | 3L2 |

INVENTOR.
RICHARD S. KAMPF
BY Arthur H. Swenson
ATTORNEY.

Nov. 27, 1962 R. S. KAMPF 3,066,299

RECORDER

Filed Sept. 8, 1958 17 Sheets-Sheet 6

INVENTOR.
RICHARD S. KAMPF

BY Arthur H. Swenson

ATTORNEY.

Nov. 27, 1962 R. S. KAMPF 3,066,299

RECORDER

Filed Sept. 8, 1958 17 Sheets-Sheet 7

INVENTOR.
RICHARD S. KAMPF

BY Arthur H. Swanson

ATTORNEY.

Nov. 27, 1962 R. S. KAMPF 3,066,299

RECORDER

Filed Sept. 8, 1958 17 Sheets-Sheet 8

INVENTOR.
RICHARD S. KAMPF

BY Arthur H. Swanson

ATTORNEY.

INVENTOR.
RICHARD S. KAMPF
BY Arthur H. Swanson
ATTORNEY.

Nov. 27, 1962  R. S. KAMPF  3,066,299

RECORDER

Filed Sept. 8, 1958  17 Sheets-Sheet 10

INVENTOR.
RICHARD S. KAMPF
BY Arthur H. Swanson
ATTORNEY

Nov. 27, 1962 R. S. KAMPF 3,066,299

RECORDER

Filed Sept. 8, 1958 17 Sheets-Sheet 11

INVENTOR.
RICHARD S. KAMPF

BY Arthur H. Swanson

ATTORNEY.

INVENTOR.
RICHARD S. KAMPF
BY Arthur H. Swanson
ATTORNEY.

Nov. 27, 1962 R. S. KAMPF 3,066,299

RECORDER

Filed Sept. 8, 1958 17 Sheets-Sheet 13

Nov. 27, 1962

R. S. KAMPF 3,066,299

RECORDER

Filed Sept. 8, 1958

17 Sheets-Sheet 14

INVENTOR.
RICHARD S. KAMPF
BY Arthur H. Swanson
ATTORNEY.

Nov. 27, 1962 R. S. KAMPF 3,066,299

RECORDER

Filed Sept. 8, 1958 17 Sheets-Sheet 16

INVENTOR.
RICHARD S. KAMPF

BY Arthur H. Swanson

ATTORNEY.

INVENTOR.
RICHARD S. KAMPF
BY Arthur H. Swanson
ATTORNEY.

United States Patent Office 3,066,299

Patented Nov. 27, 1962

3,066,299

RECORDER

Richard S. Kampf, Denver, Colo., assignor to Minneapolis-Honeywell Regulator Company, Minneapolis, Minn., a corporation of Delaware Filed Sept. 8, 1958, Ser. No. 759,675

21 Claims. (Cl. 346—109)

This invention relates to a method of and apparatus for producing a record in the form of an image or trace which is immediately visible and usable and is accomplished in full view of the operator by means of a beam of radiant energy which is caused to form in a spot upon a sensitized paper.

This invention represents an improvement upon the invention disclosed in the following applications for U.S. patents: Serial No. 631,078, filed December 28, 1956, by Robert A. Le Massena and Richard S. Kampf; Serial No. 638,729, filed February 7, 1957, by John P. Mahoney, Jr., and Richard S. Kampf; and an application filed on or about August 11, 1958, by Robert A. Le Massena for a patent on an improvement in recorders, Serial No. 754,234.

It is an object of this invention to provide an oscillograph and a process of recording in which sensitized recording paper may be run in forward or reverse direction, with or without recording in a forward direction and without recording in a backward direction, for latensification or data reduction.

Latensification (latent image intensification) means the emergence of a latent image upon exposure to fluorescent or incandescent light. This makes possible inspection and analysis of a record within a few seconds after it has been made.

It is a further object of this invention to provide an oscillograph and a recording process in which the chart lines may be recorded simultaneously while the galvanometer image or traces are being made to provide accurate reference lines for amplitude and time calibration. The grid lines (parallel to paper movement) and the time lines (vertical to paper movement) are made from sources of light separate from the source from which the galvanometer image or traces are made. This simultaneous recording insures that the record is always accurate even if the paper should shift lightly during recording or is susceptible to dimensional changes due to changing ambient conditions.

It is a further object of this invention to provide an oscillograph and a recording process having an optical system including a source of radiant energy preferably having a wave length in the ultra-violet band, a plurality of active galvanometers (which may be thirty-six in number or more), and a sensitized paper driven at a constant speed by an electric motor and adapted to receive the spot of radiant energy from the galvanometer to produce an image or trace thereon. The intensity of this spot of this radiant energy may be controlled by a filter. Each trace may be marked by means of a trace identifier which interrupts the beam of radiant energy.

It is still another object of this invention to provide an oscillograph which may be operated manually, automatically, remotely, or in multiplex.

A better understanding of the present invention may be had from the following detailed description when read in connection with the accompanying drawings in which.

Figure 19A:
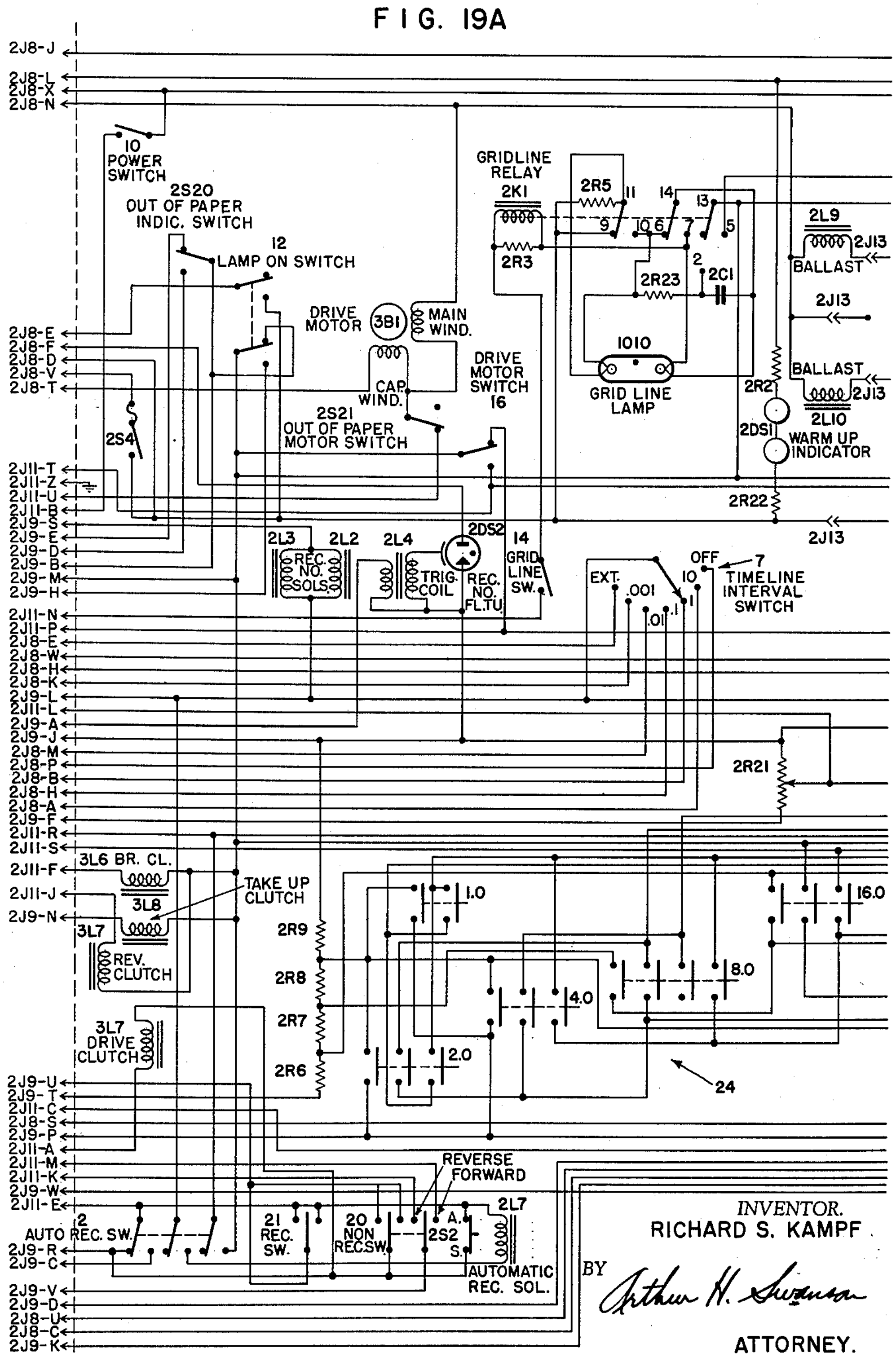
Figures 19, 19B:
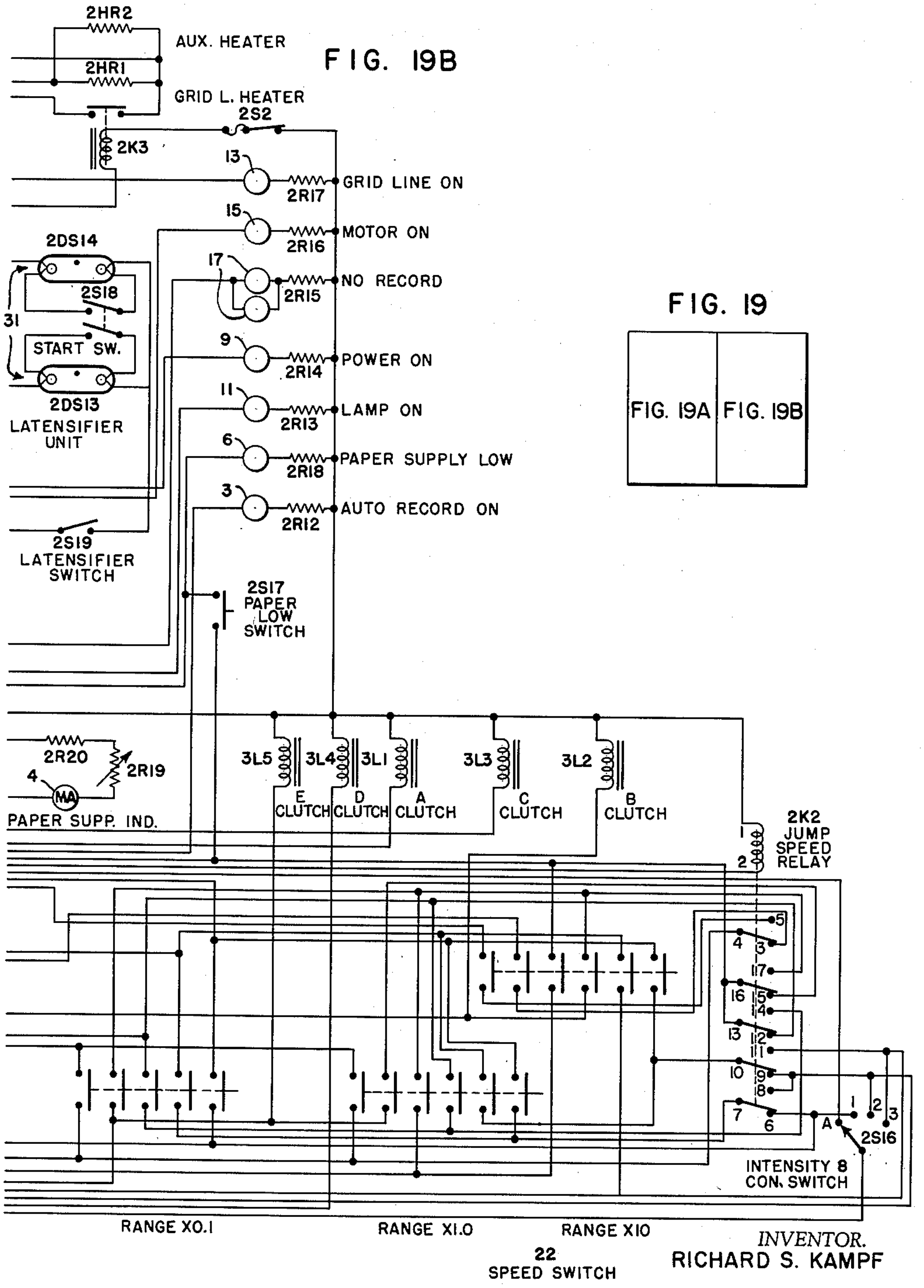

FIGS. 19, 19A, and 19B show the left and right halves of an electric circuit diagram of the wiring of this recorder without the power supply.

FIGS. 20, 20A, 20B, and 20C show the left and right halves of an electric circuit diagram of the wiring of the power supply of this recorder.

Figure 21:
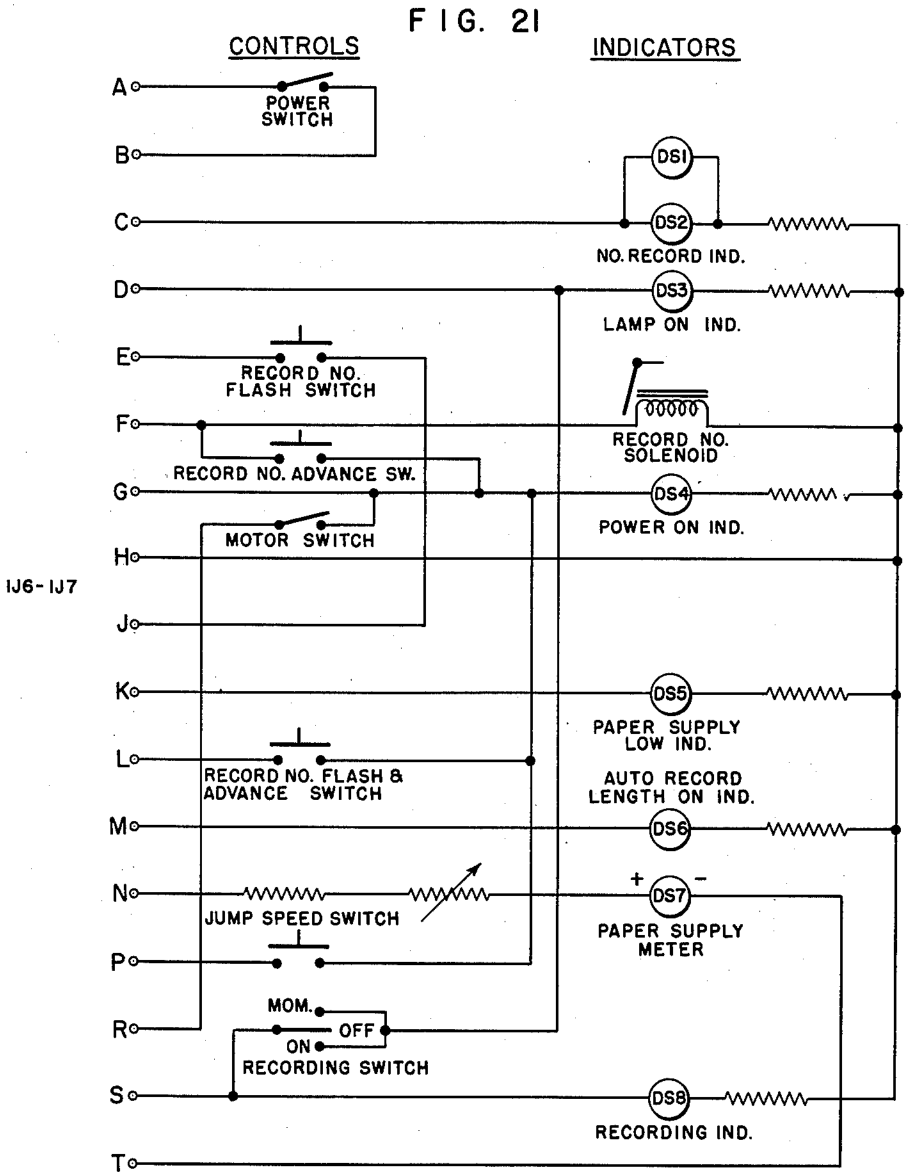

FIG. 21 is a schematic electric circuit diagram of the wiring of this recorder when connected for remote control.

Figure 22:
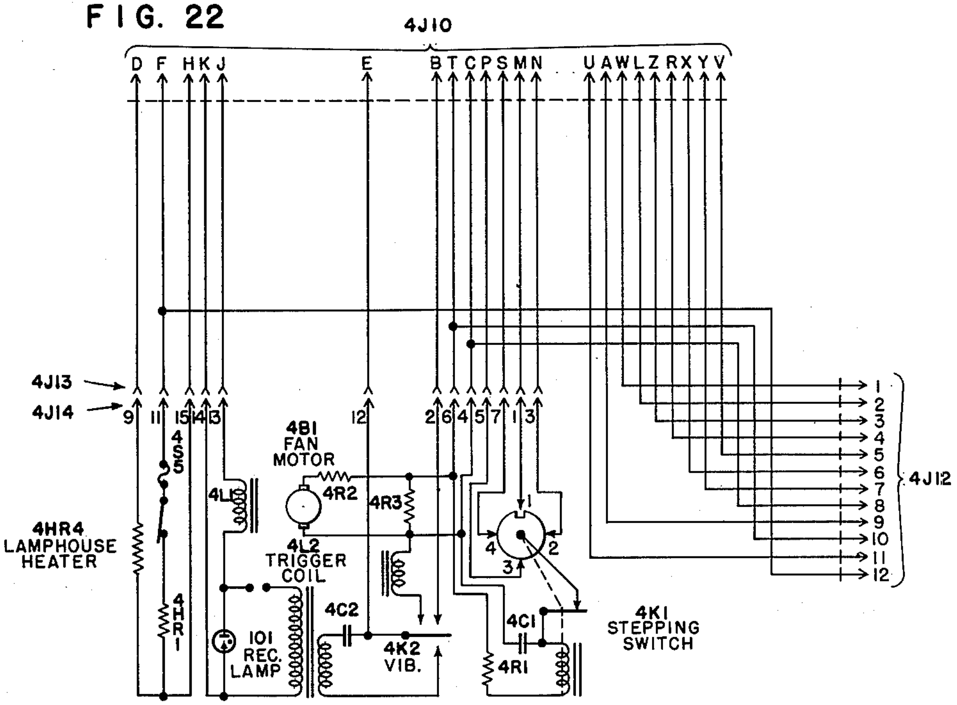

FIG. 22 is an electric circuit diagram of the wiring for recording lamp.

Figure 23:
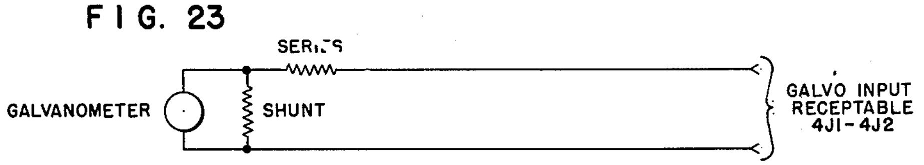

FIG. 23 is an electric circuit diagram of the wiring for one of the galvanometers.

Figure 1:
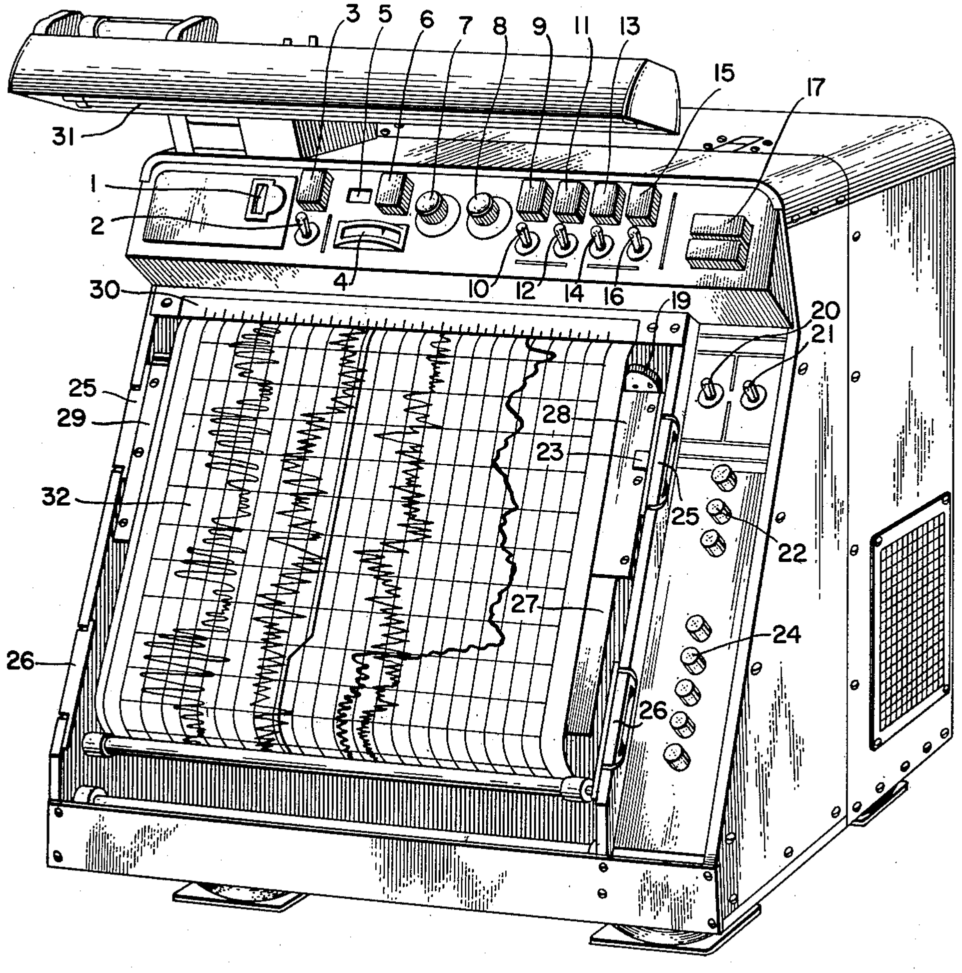
FIG. 1 is a perspective view of the front of the oscillograph showing the operating panel.
Figure 2:
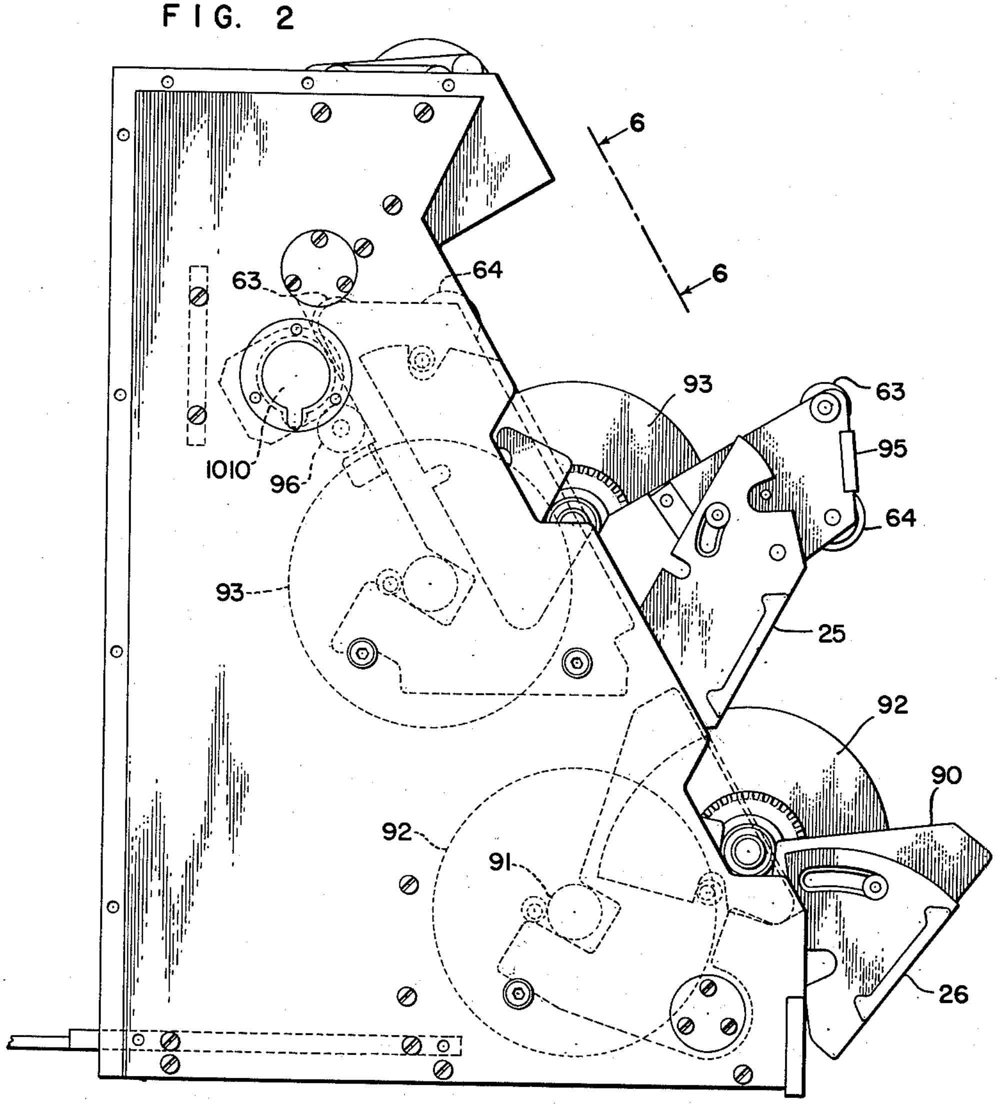
FIG. 2 is an elevation of the left hand side of the front case assembly.
Figure 6:
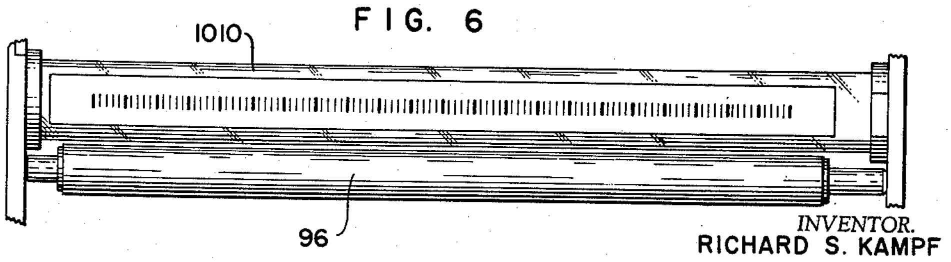
FIG. 6 is an elevation taken at 45° to the vertical on line 6—6 of FIG. 2.
Figure 9:
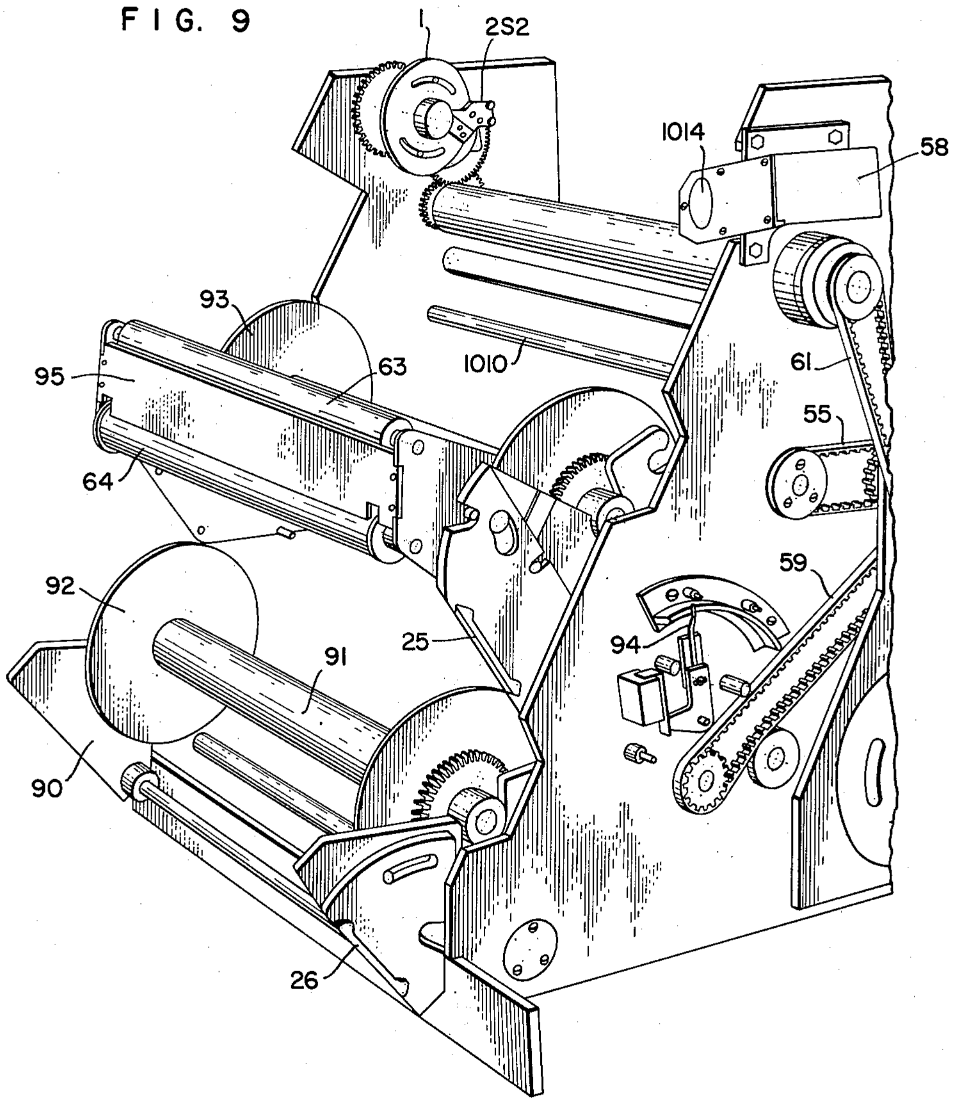
FIG. 9 is a perspective view showing the supply spool and the take up spool for the paper.

Referring now to FIG. 1 there is shown an operating panel which comprises the front of the oscillograph. Knurled wheel 1 provides for setting the length of the paper which lengths range from 0 to 25 feet. The control automatically resets at the end of each record in readiness for the succeeding records of the same length. FIG. 9 shows the knurled wheel 1 which actuates the stop switch 2S2.

A two-position switch 2 actuates the auto record length footage control and provides for either automatic or manual stopping of the paper drive. In the automatic position, the recorder stops automatically after running the paper length preset on the auto record length footage control. Automatic record length may be obtained for either recording or non-recording operations. In the manual position, manual operation of the paper drive switches starts and stops the recorder.

Indicator 3 is an electric lamp which glows green when the auto-manual record length switch is set in auto position.

Meter 4 shows the length of paper remaining on the supply spool.

Counter 5 indicates the next number to be photographed, along with an adjacent event-marker arrow and instrument serial number, on the paper. When the recording switch 21 is closed at the beginning of each automatic or manual run the record being made on the paper is numbered provided a record number switch (not shown) on the power input panel on the rear of the oscillograph is in the internal position. When the record number switch is in the external position, operation of the recording switch 21 will not produce a number on the record. Through appropriate connections (not shown) in the remote connector, however, the record number solenoid and flash tube may be operated independently or simultaneously.

Figure 12:
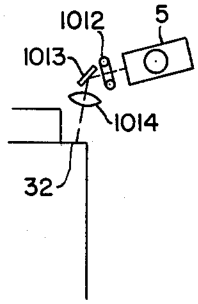
FIG. 12 is a diagrammatic or schematic front elevation of the record number counter as shown in FIG. 10.

This record numbering system is shown in greater detail in FIG. 12. A flash of light from the flash tube 1012 illuminates the record number appearing in the aperture in counter 5 along with the event-marker arrow and serial number of the oscillograph. These images are reflected by the record number mirror 1013 through the recorder number lens 1014 (in the record numbering box 58, FIG. 9) to focus on the paper 32 on the recording plane.

Indicator 6 is an electric lamp which glows red giving a warning light when less than 25 feet of paper remain on the supply spool.

Rotary switch 7 provides for time lines on the paper at intervals of 10, 1, $\frac{1}{10}$, $\frac{1}{100}$, or $\frac{1}{1000}$ seconds. Time lines are recorded vertical to the direction of movement of the paper. Switch 7 may be turned to off position for no time lines or to external position for external signals. Time lines are recorded only when the recording switch 21 is closed. Each tenth line is accentuated except at 10-second intervals.

Figures 13, 14:
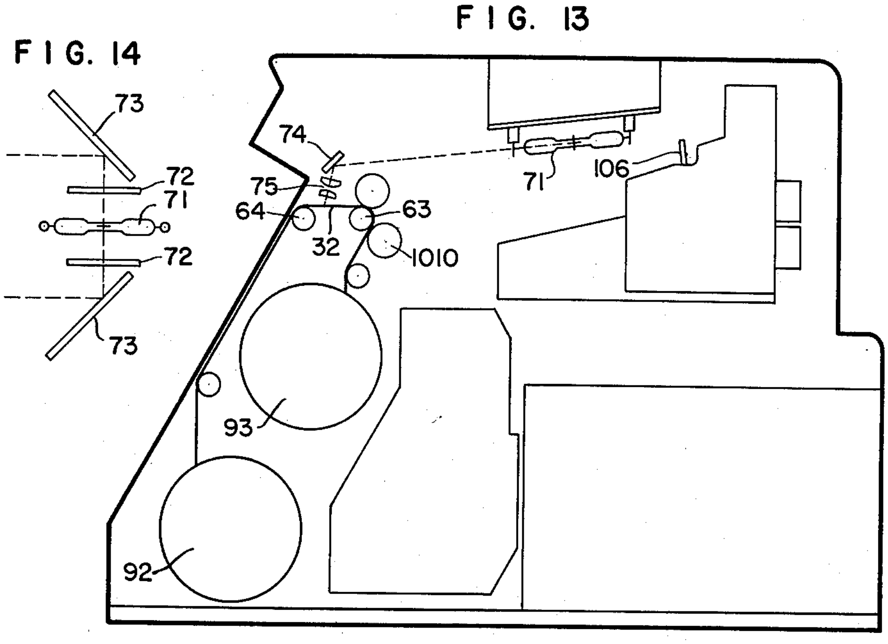
FIG. 13 is a diagrammatic or schematic view in vertical cross section showing the means for making the time lines.
FIG. 14 is a substantially horizontal view showing a portion of the mechanism shown in FIG. 13.

FIGS. 13 and 14 show in greater detail the means for forming the time lines. These means comprise an electric flash tube 71 which produces two beams of radiant energy. These beams pass through the lenses 72 to the mirrors 73 which deflect the time lines onto the recording mirrors 74 and then through the recording lenses 75 to the paper 32 on the recording plane.

Power switch 10 starts the cooling fans, lights the power-on indicator (comprised by an electric lamp 9 which glows green when the power switch 10 is closed), turns on the heaters in the magnet assemblies of the galvanometers, and supplies power to the rest of the oscillograph. This power is supplied from a commercially available source of electricity at 105–125 volts, 60 cycles per second at approximately 9.0 amperes maximum.

Indicator 11 is an electric light which glows green when the lamp starting circuit turns on the recording lamp 101.

A two-position lamp switch 12 controls the supply of electricity to recording lamp 101. In closed position power is supplied to the lamp starting circuit. In off position, or in on position with the lamp not ignited, the paper drive may be operated by non-recording switch 20 but not by recording switch 21.

Figure 3:
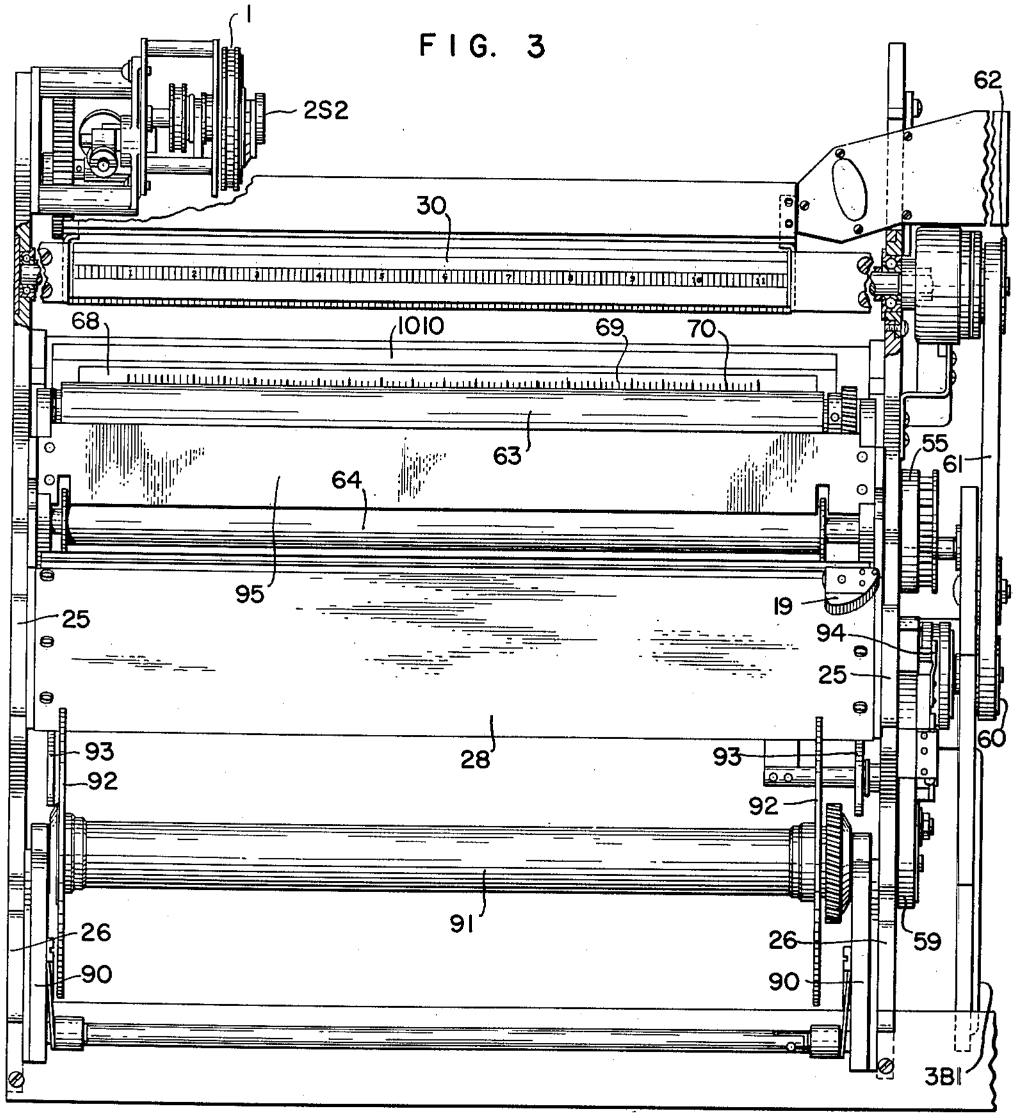
FIG. 3 is an elevation of the front of the front case assembly.
Figures 4, 5:
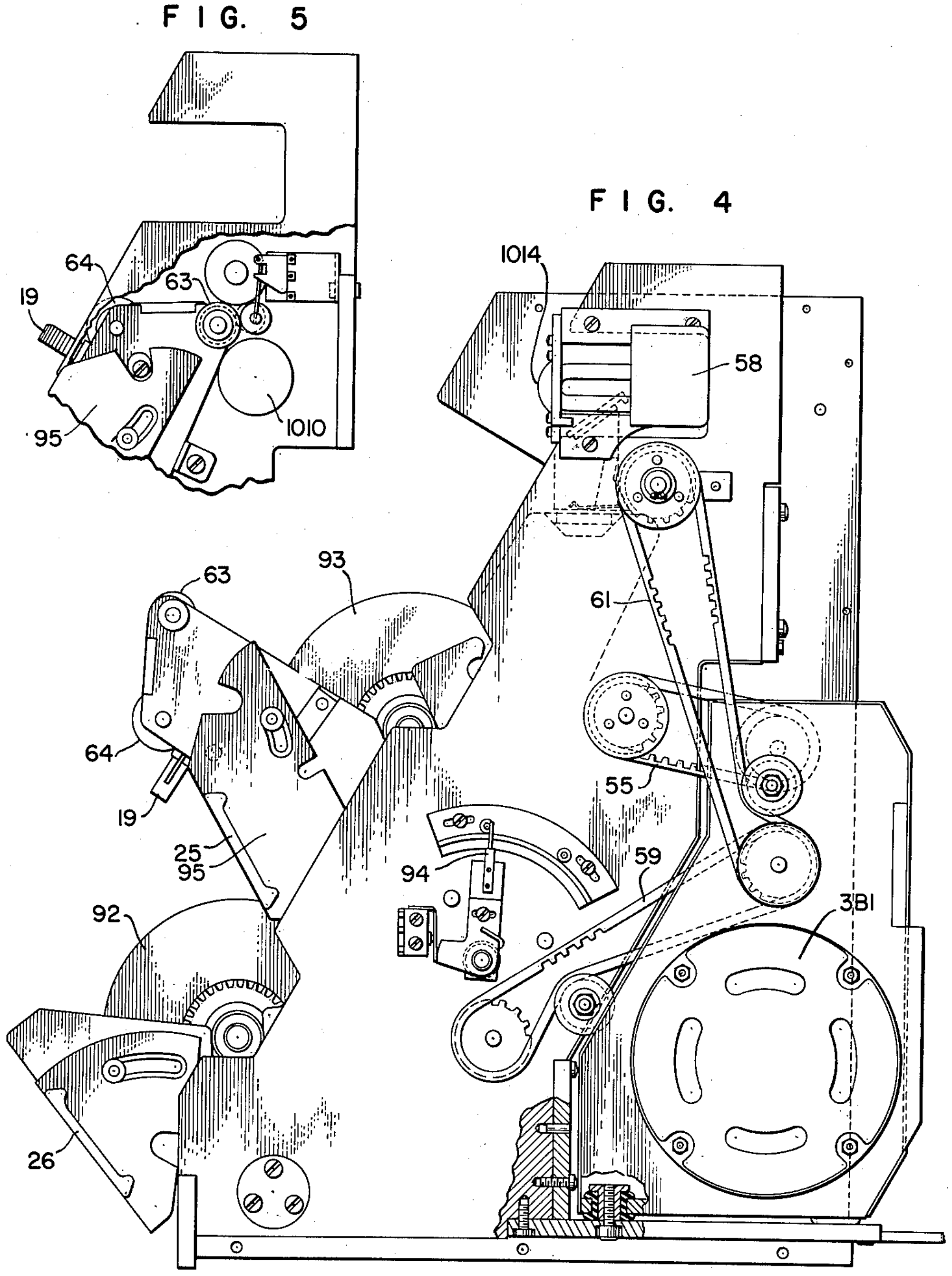
FIG. 4 is an elevation of the right hand side of the front case assembly.
FIG. 5 is an elevation of a portion of the right hand side of the front case assembly with the case removed.
Figure 10:
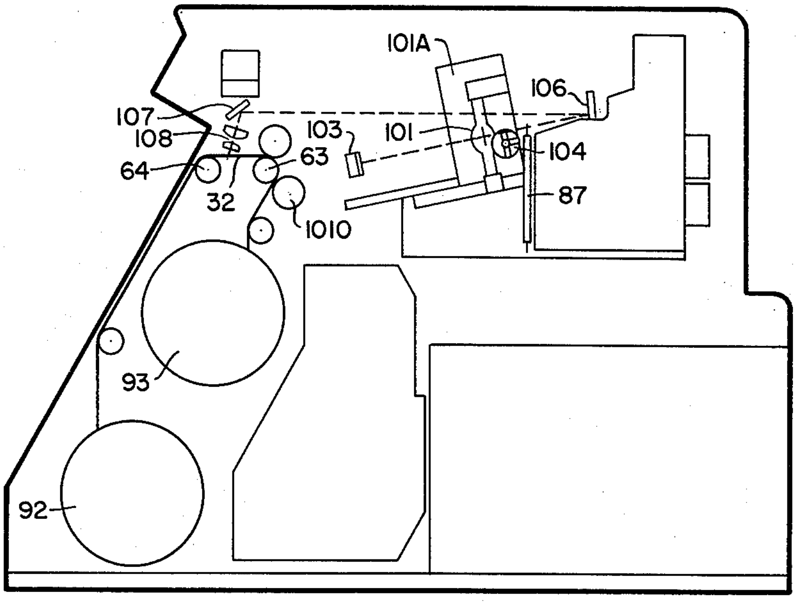
FIG. 10 is a diagrammatic or schematic view in vertical cross section of the oscillograph.

Switch 14 is a two-position switch which, in closed position, supplies electricity to the grid line lamp 1010 (FIG. 10). Indicator 13 is an electric lamp which glows green when the grid line lamp 1010 is turned on. Grid line lamp 1010 will normally be on when the grid line switch 14 is turned on, but is turned off whenever the non-recording switch 20 operates the paper drive. Lamp 1010 may be a fourteen watt, black light, fluorescent, electric lamp. FIG. 3 shows an element 68 of the lamp assembly which has in it narrow slots 69 and slightly wider slots 70 which occur every fifth slot and which facilitate evaluation. These slots 69 and 70 produce amplitude calibration reference lines or "grid lines" which extend longitudinally of the paper. In this manner the galvanometer spots can be positioned on or within the limits of any grid lines, calibrated in units of the phenomena to be measured, and the results read directly off the record in these same units. Because the grid lines and the images or traces are recorded simultaneously, there can be no inaccuracies as a result of shifting or shrinkage of the paper.

A two-position switch 16 operates paper drive motor 3B1 (FIG. 7) and indicator 15, which is an electric lamp which glows green whenever the paper drive motor 3B1 is energized. Switch 16 energizes the no record indicator 17 when switch 16 is open.

The no record indicator 17 is an electric lamp which glows red under any of the following conditions:

A—Lamp switch 12 is in off position.
B—Lamp switch 12 is in on position but lamp is not in operation.
C—Paper supply exhausted.
D—Non-recording switch 20 is controlling the paper drive.
E—Motor switch 16 is in off position.

A paper knife 19 is mounted so that it slides across the top of the upper, fixed platen 28 to cut off an individual record. Paper knife 19 is spring loaded to return automatically to its original position.

Non-recording switch 20 is of the three-position toggle-type and provides for forward and reverse motion of the paper 32 without recording. Operation of switch 20 in either momentary forward or momentary reverse position drives paper normally but cuts off the recording spots of the galvanometers, the grid lines, and the time lines and will not operate the record numbering system.

Recording switch 21 is of the toggle-type and has three positions marked momentary, on, and off, which is the center position. For manual operation (when the auto-manual record length switch 2 is in manual position), the recorder will operate when the recording switch 21 is in either momentary or in on position. The record number is recorded and advanced every time the recording switch 21 is closed. For automatic operation (auto-manual record length switch 2 in auto position), the recording process is started with the recording switch 21 and stopped with auto record length control. The record number is recorded and advances only when the recording switch 21 is operated at the beginning of an automatic run. The recording lamp 101 must be on for the recording switch 21 to be operative.

Push-button switches 22 select a setting which determines the factor by which any setting of the speed button 24 must be multiplied to give the actual paper speed in inches per second. These factors are $\frac{1}{10}$, one, or ten for low, medium, or high speed range, respectively. Speeds are not accurate in reverse but vary with diameter supply spool. In reverse operation, range button 22, marked for a factor of ten, functions as a factor of one. Buttons 22 are interlocked to prevent simultaneous operation.

Release 23 releases the latch which holds the movable platen in up position behind the fixed platen. Push-button switches 24 select one of five settings 1, 2, 4, 8, or 16 inches per second, which determine the particular paper speed for a given speed range. Buttons 24 are interlocked to prevent simultaneous operation.

Platen handles 25 assist in sliding movable, lower platen 27 behind fixed, upper platen 28.

Latch handles 26 pull out and down for access to paper-takeup spool in the take-up cradle during paper loading.

Lower, movable platen 27 and upper, fixed platen 28 provide a writing and viewing surface for the exposed record on the paper. Movable platen 27 slides up behind fixed platen 28 during paper loading. Supply cradle latch handle 29 pulls out and down for access to paper supply spool during loading.

Amber-colored viewing window 30 enables the operator to observe the spots made by the beam of radiant energy from the galvanometer mirrors during the positoning and recording operation.

Latensifier lamp 31 intensifies the latent images on the length of paper exposed to the lamp. Lamp 31 is controlled by a starting switch and an on-off switch (not shown). Latensification (latent image intensification) is the emergence of a latent image upon exposure to fluorescent or incandescent light. This permits inspection and an analysis of a record within a few seconds after recording.

A record is latensified by exposing it to white fluorescent light. At room level intensity (about 50-foot candles) or higher intensity an invisible trace will become visible and readable in a few seconds. At low recording speeds (about 300 inches per second) this will occur in about ten seconds. At high recording speeds (about 10,000 inches per second) up to 30 seconds may elapse. If the record is to be kept in a note book or examined under illumination, further latensification is optional. However, further latensification is necessary if better trace contrast is desired.

For better trace contrast, the latensification time is determined by the contrast desired. Very good contrast is obtained by latensifying ten to thirty minutes at room level intensity. During latensification the background of the record becomes light-blue gray which reverts to light tan when latensification is completed. The oscillograph of this invention provides a most convenient means of latensification. The record may be run forward and backwards at low speed to achieve the desired latensification. Complete latensification produces a record with a blue trace on a light tan background. Humidity has little or no effect on latensified records. Latensified records are stable under average interior light conditions for many hours. They are permanently stable when stored in a file or desk drawer. Latensified records are not permanent in direct sun light.

Records may be fixed for increased stability to light by treating the records for five to ten minutes in a solution such as that sold under the trademark "Photo Flo" prepared according to the manufacturer's instructions. The records must be thoroughly dried.

Figure 7:
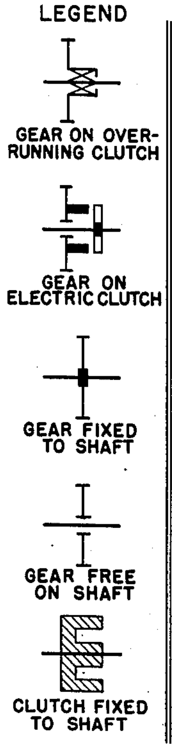
FIG. 7 is a diagram of the electric motor-to-paper drive.
Figure 7:
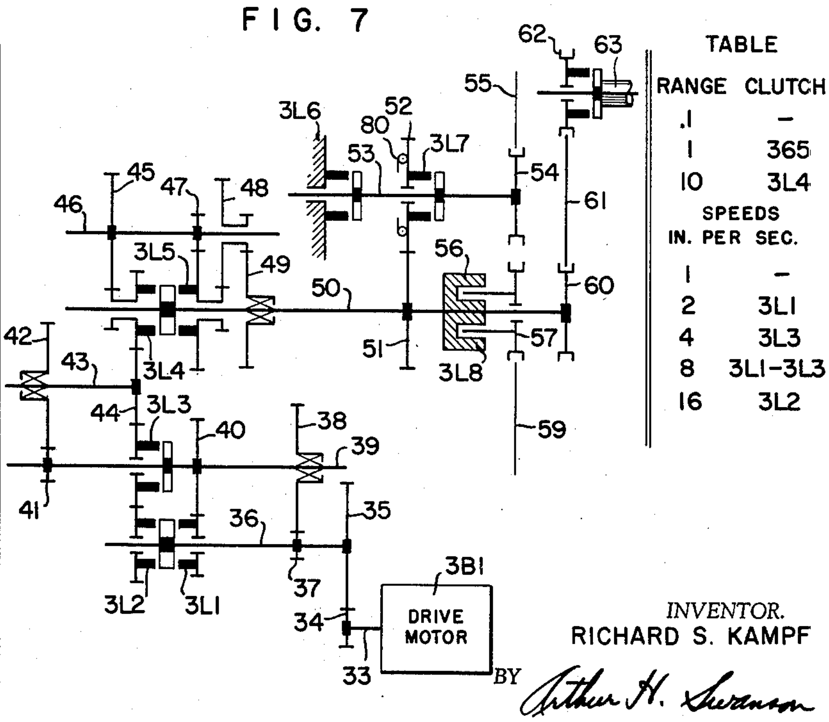

For a disclosure of the means whereby the paper is driven from the supply spool to the take-up spool by means of an electric motor, reference is made to FIGURES 2, 3, 4, 5, 7, 8 and 9. FIG. 7 is a schematic showing of the transmission from the drive motor to the drive roller. This transmission has five speeds in each of three ranges (fifteen steps). FIG. 7 contains a legend showing a gear on an over-running clutch, a gear on an electric clutch, a gear fixed to a shaft, and a gear free on a shaft. FIG. 7 also includes a table showing the range or multiplication factor of the transmission and the output speed in inches per second. This table also shows, under the heading "Clutch," reference characters which designate which clutch is engaged in order to obtain the particular speed opposite this clutch reference character in the table.

Drive motor 3B1 has an output shaft 33 to which is secured a gear 34 meshing with a gear 35 fast on shaft 36. Gear 37 is fast on shaft 36 while the gears forming parts of clutches 3L1 and 3L2 may be either connected to or disconnected from shaft 36.

Gear 37 meshes with gear 38 which is mounted on an overrunning clutch on shaft 39. The gear on clutch 3L1 meshes with gear 40 fast on shaft 39. The gear on clutch 3L2 meshes with the gear on clutch 3L3 which may be either connected to or disconnected from shaft 39. Gear 41 is fast on shaft 39 and meshes with gear 42 mounted on an over-running clutch on shaft 43 which has fastened to it gear 44 which also meshes with the gear of clutch 3L3.

Gear 44 also meshes with the gear of clutch 3L4 which also meshes with gear 45 fast on shaft 46. Gear 47 is also fast on shaft 46 and meshes with the gear of clutch 3L5. The gear of clutch 3L5 also meshes with gear 48 which is free on shaft 46 and which also meshes with gear 49 mounted on an over-running clutch on shaft 50.

Gear 51 and the driving portion 56 of clutch 3L8 are fast on shaft 50 as is gear 60.

Gear 51 meshes with gear 52 on pulley 3L7 which may be connected to or disconnected from shaft 53. A brake 3L6 may be connected to or disconnected from shaft 53 which also has pulley 54 fast to it. Pulley 54 drives belt 55 which is connected to the supply spool. Pulley 60 drives belt 61 and pulley 62 which is connected to the driving element of a drive clutch which may be connected to or disconnected from the drive roller 63.

The drive clutch is a "Warner" clutch. Clutch 3L8 is a "Magtrol" clutch. All the other clutches are "Simplatrol" clutches.

FIG. 9 shows a partial front case assembly with the covers removed. A take-up cradle 90 supports a takeup spool having a take-up spool sleeve 91 intermediate the ends thereof. A supply cradle 95 supports a similar paper supply spool 93 on it. Belt 55 drives the paper supply spool 93. Belt 59 drives the paper take-up spool 92. Belt 61 drives the pulley of drive clutch which in turn drives drive roller 63. Gear 64 normally meshes with a gear on drive roller 63 to drive it.

The operation of the paper drive transmission is as follows. When the motor switch 16 (FIG. 1) is in the off position it supplies power to the no record indicator 17. When motor switch 16 is in the on position, the recording lamp must also be on and the drive motor 3B1 starts. The chart speed push buttons 24 control the speed of the paper drive transmission. Selection of range buttons 22 and speed buttons 24 on the control panel engage the proper combination of clutches for that speed.

Closing the recording switch 21 energizes appropriate relays to cause the record numbering flash tube circuit to photograph a number on the record. The two record number counters advance immediately to the next number in preparation for the following record. The record travels at the previously selected speed as long as the recording switch 21 is on or for the duration of the automatic run.

The non-recording switch 20 is identical to the recording switch 21 with the following exceptions: the record numbering circuit is not energized. In operation, in either direction the non-recording switch 20 causes the intensity control to rotate to opaque position when the recording lamp 101 is on and turns off the grid line lamp 1010. The non-recording switch 20, in addition to the above function, when in reverse position, energizes the proper clutches to cause the paper 32 to travel in the reverse direction. In the reverse operation, the paper speed is controllable by the push buttons 22 and 24 and is related to the diameter on the supply spool and is not constant. The no-record indicator 17 is lighted.

Paper tension is maintained during operation. The supply spindle brake 3L6 is energized with only sufficient current to maintain a constant braking drag on the supply roll 93. The take-up spindle clutch 3L8 is partially energized to maintain a constant paper tension. In reverse operation, the drive roller 63 is disengaged by means of drive clutch and the take-up clutch is partially energized to provide a small braking drag. The reverse clutch 3L7 is fully energized and driven at rewinding speed controlled by the push buttons 22 and 24.

An accelerate circuit momentarily increases voltage on take-up clutch 3L8 to provide the additional torque required to accelerate the take-up spool and maintain paper tension during acceleration when: (1) the instrument is started at one of the higher speeds, or (2) a high speed button is pushed while the instrument is running at low speed. This same circuit decelerates the paper by applying full voltage momentarily to the brake 3L6 when: (1) the instrument stops, or (2) a lower speed button is pushed while the instrument is running at high speed.

Figure 11:
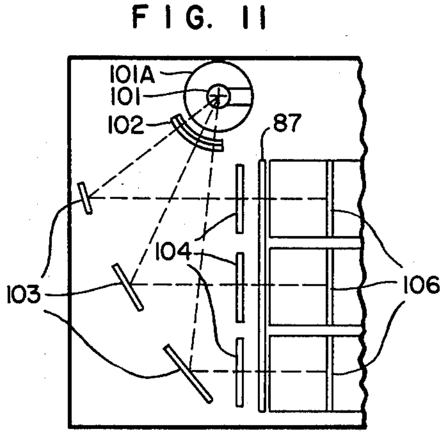
FIG. 11 is a top or plan view (taken at a slight angle to the horizontal) showing the light source.

The optical system as shown in FIGS. 10 and 11 provides "center galvanometer magnet bank performance" for all three banks by causing the incident light falling on the galvanometers from the light source to be normal to the line along which they are mounted. This allows the galvanometers to be positioned normally "straight ahead," and therefore no non-linearities or unsymmetrical sensitivities are introduced as a result of the galvanometer coils having to be positioned with an initial rotation relative to the direction of the magnetic flux in the galvanometer magnet banks. Uniform galvanometer illumination is accomplished by making the effective optical distance from the source to each magnet bank the same.

A further advantage to this system is that it allows the recording lamp to be placed off to the side of the galvanometer banks and out of their light path to the recording paper. Normally, in oscillographs, the distance from the galvanometers to the paper is equal when the galvanometers are in their straight ahead position.

The recording lamp 101 is a two-element, mercury-vapor, electric lamp enclosed in a quartz envelope and adapted to emit a beam of high intensity ultra-violet light. An example of such a lamp is the Osram lamp having an 0.012 inch diameter arc which is manufactured by the Osram Company in West Germany, and identified as their model HBO-109. The beam of radiant energy from lamp 101 is concentrated by the collector lens 102 and is directed to the three, light-control mirrors 103. The mirrors 103 reflect the beam through the spot intensity control comprised by filters 104, past the trace identifier 105, and through the galvanometer lens to the galvanometer mirror of the galvanometer 106. The galvanometer mirror reflects the radiant energy back though the galvanometer lens to the recording mirror 107, and through the recording lens 108 onto the paper 32 on the recording plane.

Rotary switch 8 controls the intensity of the radiant energy falling on the galvanometer and consequently, the intensity of the recording spot. Switch 8 has four positions. When set in automatic position, rotary switch 8 allows the intensity of the galvanometer spot to be automatically adjusted as a function of the speed of the paper by push buttons 22 and 24. The other three positions of switch 8 provide means for manually selecting the intensity of the spot desired. This control operates only when the recording lamp 101 is energized.

Figure 15:
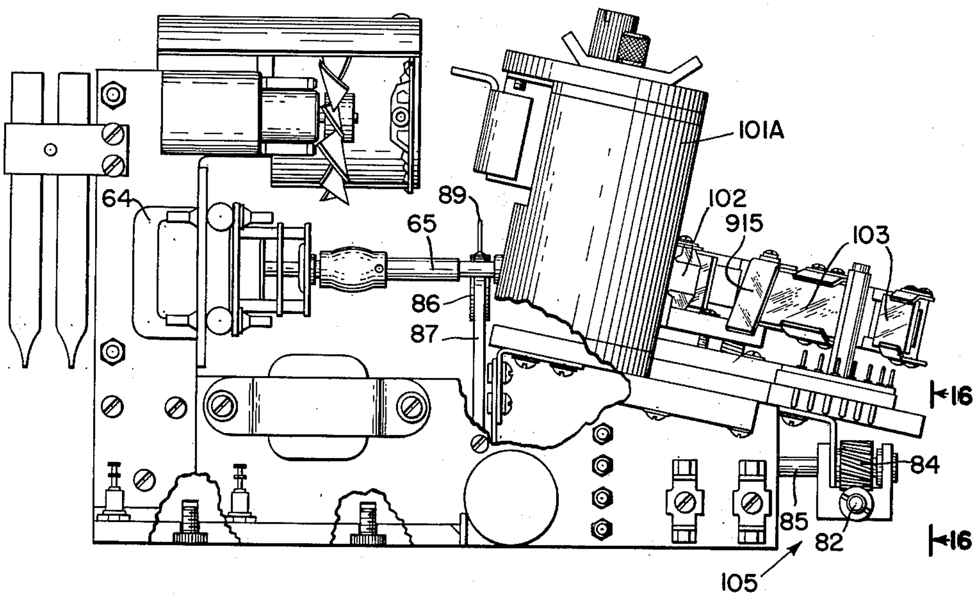
FIG. 15 is a left hand elevation of the light control center.
Figure 17:
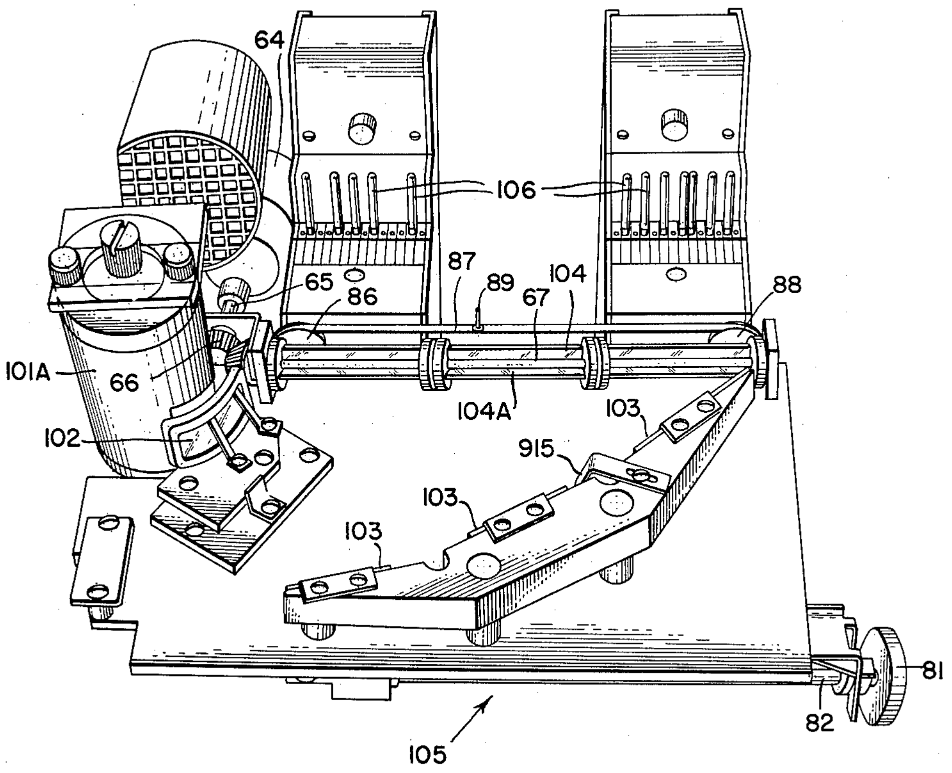
FIG. 17 is a perspective view of the light control center.

FIGS. 11, 15 and 17 show in greater detail how the intensity control of the galvanometer spot operates. Rotary switch 8 is manually operated to apply power to all but one of the four contacts on the stepping switch 64. This operates its stepping solenoid until the contact with no power is reached. As is best seen in FIG. 17, stepping switch 64 has an output shaft 65 which terminates in gearing 66 connected to shaft 67. Three filters are mounted on shaft 67. 104 and 104A appear in FIG. 17. The third filter is not visible in FIG. 17 because it is at right angles to the plane filters 104 and 104A. The fourth position between filters 104 and 104A is blank. The spot intensity control mechanism therefore has four positions: no filter (a blank spot for passing the beam without reduction in intensity), a minimum filter, medium filter, and an opaque filter. The non-recording switch 20 turns this control to the opaque position to prevent retraces on the record. In the automatic position the spot intensity control is set by the chart speed push buttons selected. If the recording lamp 101 is off, the circuit is disabled as it is not needed. At any time the operator may switch the control switch 8 from automatic to any one of the three manual positions.

Means are provided for easily correlating each galvanometer and its trace. These means comprise means for interrupting light to each galvanometer in sequence.

Figure 8:
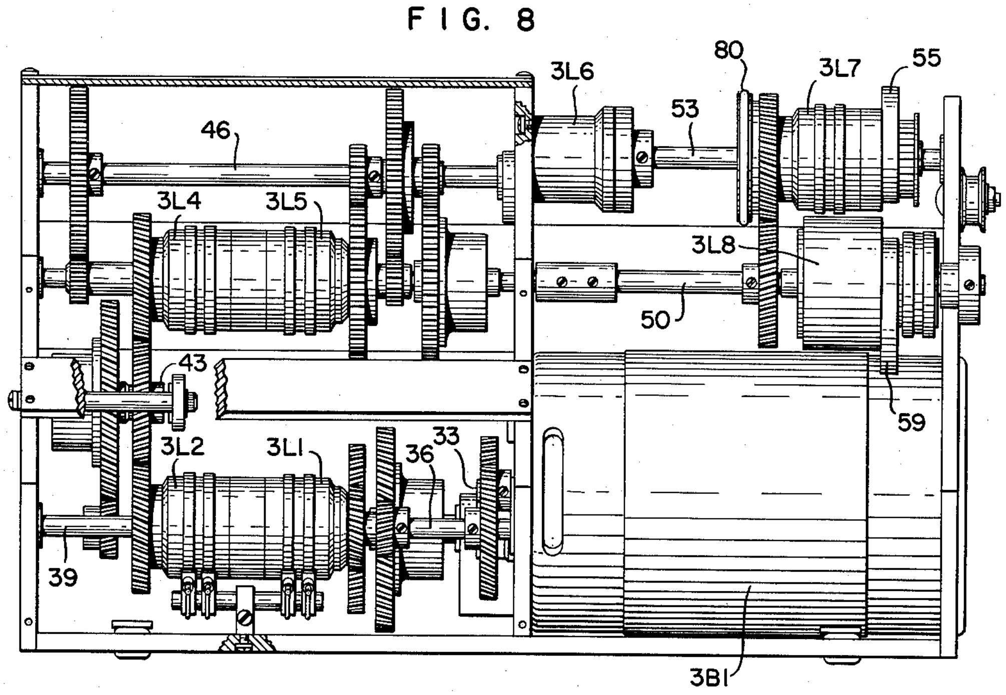
FIG. 8 is a front elevation of the electric motor-to-paper drive.
Figure 16:
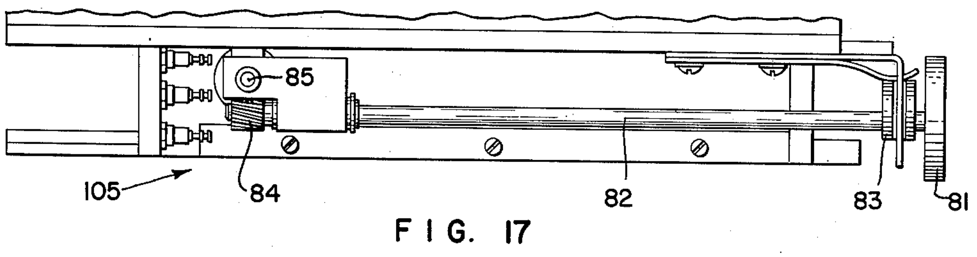
FIG. 16 is a substantially vertical cross section on line 16—16 of FIG. 15.

FIGS. 7, 8, 16, and 17 should be referred to for a detailed showing of these means. Referring to FIGS. 7, and 8 it will be seen that gear 52 of clutch 3L7 carries an O-ring 80 on it. Referring to FIG. 16, it will be seen that O-ring 80 engages with a disc 81 fast on a shaft 82 rotatably mounted in a bearing 83 on the galvantometer case. Shaft 82 connects, at its opposite end, with right-angle gearing which drives a shaft 85. Referring to FIG. 17, shaft 85 carries at its rear a pulley 86 on which is mounted a belt 87 trained at its opposite end around pulley 88 and carrying on its outer surface a rod 89 which interrupts the beam of light to each galvanometer in turn so as to produce a break in the trace produced by each galvanometer on the paper 32. These breaks in the traces occur in the same sequence and thus serve to correlate each trace to galvanometer producing it.

Paper speed and light interrupter pin 89 speeds are correlated so that if traces did not overlap and were evenly distributed across paper these interruptions would follow a line approximately 45 degrees to the edge of the paper. In other words, the shadow or interruption is caused by the rod 89. This shadow or interruption would travel across the paper 32 in a line extending at an angle of approximately 45 degrees to the edge of the paper if the records or traces were uniformly located across the width of the paper 32. Each successive interruption of each trace is spaced in the direction of travel of the paper by the same amount. Depending upon the location of the trace at the time at which the light beam forming the trace is interrupted the interruption or space may be located at any point across the width of the paper 32. However, the interruption of each trace is spaced lengthwise of the paper from the interruption of the preceding trace and from the interruption of the succeeding trace so that each trace can be identified by the position of the interruption.

The recording paper 32 of this invention may be the paper described in U.S. Patent 2,580,427 to C. A. Heiland, patented January 1, 1952, and described in that patent as follows. It has been found that emulsions of high sensitivity having this characteristic of immediate visible reaction to the invisible rays may be prepared by a two-step process consisting in preparing first a bromide emulsion in the customary manner by causing a reaction between silver nitrate and potassium bromide in the presence of colloidal gelatin and then coating the paper or film with this liquid and then treating the emulsion on the film or paper with a solution of silver nitrate of low concentration or with two solutions, the first consisting of potassium nitrate of low concentration, and the second consisting of silver nitrate of low concentration which is applied after the emulsion has dried.

Alternately, the film used in this invention includes an emulsion which contains silver nitrate and/or has an excess of silver nitrate, or may be a similar emulsion which is intended to produce a trace or image by the action of radiant energy alone. Among such films are those made and sold by Eastman Kodak Company and identified as its No. 1090. The following is an analysis of Eastman-Kodak No. 1090 paper. These results were obtained using spectroscopy, X-ray diffraction, and quantitative analysis.

A spectroscopic analysis of the emulsion gave no evidence of the presence of metals other than silver. This indicates the absence of heavy-metal doping agents, but does not say anything about the presence or absence of organic agents. In fact, none of these tests would have detected organic agents.

An X-ray diffraction analysis showed the silver to be present as the inorganic compound, silver bromide. However, silver iodide could not be detected in an especially prepared material known to contain 5 percent silver iodide. Definitely, it was established that silver chloride was not present as a principal constituent.

Quantitative analysis of the emulsion showed that the sensitive materials were present as follows, in terms of percentages of the initial weight of coated paper:

| | Percent by weight |
|---|---|
| Ag | 2.46 |
| Halide | 2.17 |
| Iodide | 0.06 |
| Bromide | 2.11 |

In terms of the silver halides, the composition of the material is:

| | Percent by weight |
|---|---|
| Silver bromide | 97.4 |
| Silver iodide | 2.6 |
| | (or 1.8 mol percent) |

There appears to be about 18 percent of excess soluble bromide in the emulsion.

Another paper which may be used is that sold by the Eastman Kodak Company under its trademark Kodak Linagraph Direct Print Paper.

Another paper which may be used in this invention is that made and sold by AGFA, A.-G., Leverkusen, West Germany, and identified as agfrec. 1.

Figure 18:
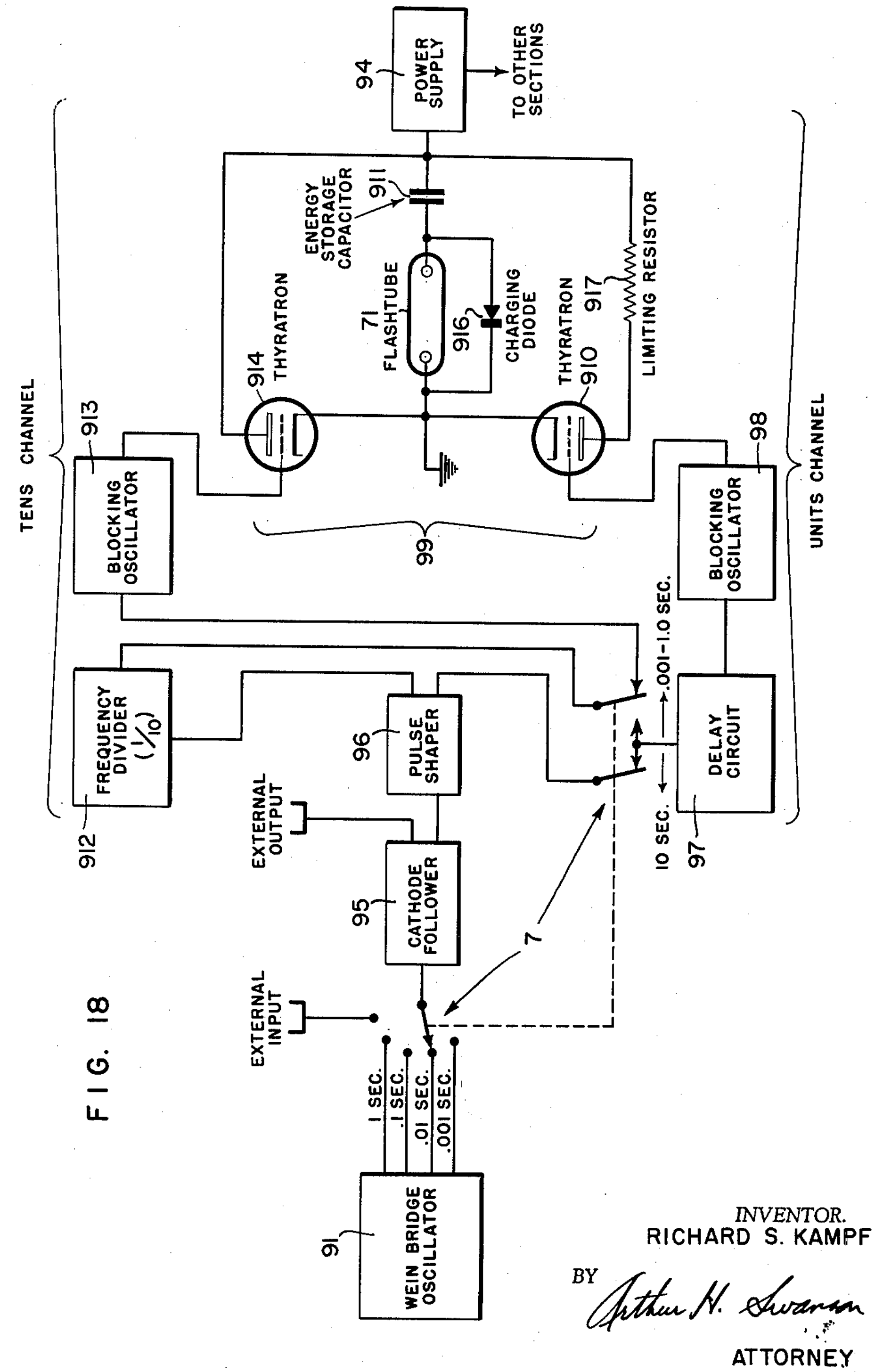
FIG. 18 is a block diagram showing the electric lamp which makes the time lines by flashing.

FIG. 18 illustrates the flash tube time line system. The purpose of this system is to provide time lines across the width of the record paper at definite time intervals which may be correlated with the speed at which the record paper is being run, as previously described. To this end, the flash tube time line system includes a so-called Wien bridge oscillator, 91, a time line interval switch 7 which is operative to select the intervals at which repetitive pulses of high current are caused to flow through a gas discharge flash tube 71 to produce time lines on the record paper. The power supply 94 furnishes the proper voltages for the flash tube and the circuits controlling it. The Wien bridge oscillator provides a sine-wave time base signal which is selected by the adjustment of the interval switch 7. A cathode follower 95 supplies the sine-wave time base signal to pulse forming networks including a pulse shaper 96 and a units channel including a delay circuit 97 and a blocking oscillator 98. The latter are synchronized to the sine-wave to feed timing pulses to the thyratron unit 99 including a thyratron tube 910 which is operative to discharge an energy-storage capacitor 911 through the flash tube 71. These synchronizing pulses are also fed into a tens channel including a frequency divider 912 and a blocking oscillator 913, which are operative to produce a pulse for each ten synchronizing pulses. This pulse is fed to the thyratron unit 99 and triggers another thyratron 914, discharging a higher amount of energy through the flash tube 71 to produce more intense tens lines. The flash tube 71 is subjected to ionizing ultraviolet radiant energy derived from the Osram lamp by way of the preionisation mirror 915 as seen in FIG. 17. This reduces the break-down voltage of flash tube 71 and promotes uniform operation. The instrument case cover must close for the mirror 915 to function.

As is illustrated in FIG. 18, the unit 99 also includes a charging diode 916 which is connected in shunt to the flash tube 71, and also includes a limiting resistor 917 which is connected in series in the anode circuit of the thyratron 910.

A suitable thermo-time delay relay may be provided which, when energized on application of electrical power to the instrument, applies power to the thyratron unit 99 following a two-minute or other warm-up period of suitable length. To that end, the application of power to the anodes of the thyratron tubes 910 and 914 is delayed until the filaments in the thyratron tubes attain their operating temperature. A suitable blanking relay may also be provided to bias the blocking oscillators 98 and 913 to cut-off. The recording switch 21, available for operation from the front of the instrument, as seen in FIG. 1, preferably is operative to deenergize this blanking relay to start the time lines, whereby the time lines are started when the recording switch is operated into its record position.

As is customary in power supply circuits such as those embodied in the flash tube time line system, suitable fuses may be provided to protect the high-voltage and other circuits.

The schematic diagram of the overall circuitry of the oscillographic instrument except for the power supply circuit, is illustrated in FIGURE 19. The schematic diagram of the power supply circuitry is shown in FIGURE 20.

FIGURE 19 shows the electrical wiring connections for the following switch and other elements which previously have been described: the record length footage control stop switch 2S2; the two-position automatic record length footage switch 2; the indicator 3 which glows green when the auto-manual record length switch 2 is set in its automatic position; the meter 4 which shows the length of paper remaining on the supply spool 93; the solenoids 2L2 and 2L3 which actuate the record number counters; the indicator 6 which indicates when the paper supply remaining on the supply spool 93 is low; the four-position spot intensity rotary control switch 8 which is operative in its different positions of adjustment to correlate the intensity of the galvanometer spot as a function of paper speed, or as manually adjusted; the electric lamp 9 which glows green when the power switch 10 is closed; the circuit for the power switch 10 which starts the cooling fan 4B; and also turns on the heaters 4HR1 and 4HR2 in the magnetic assemblies of the galvanometers, as shown in FIG. 22, and supplies power to the rest of the recording oscillograph instrument; the indicator lamp 11 which glows green when the lamp starting circuit turns on the recording Osram lamp 101; the two-position lamp switch 12 which controls the supply of energizing current to the recording lamp 101; the two-position switch 14 which actuates the grid-line relay 2K1 to energize the grid line lamp 1010, which condition is indicated by glowing of the indicator 13; the paper-drive motor indicator 15; the two-position switch 16 which when actuated to its "on" position operates the paper drive motor 3B1; the no-record indicator 17 comprising two parallel connected lamps which are energized under the several conditions noted hereinbefore; the non-recording three-position switch 20 which provides for forward and reverse motion of the recording paper 32, without recording; the three-position recording switch 21 which provides for momentary or continuous recording operating at the will of the operator; the three push-button speed range switches 22 which determine the factor by which the record speed for any setting of the push-button speed switches 24 is multipled; the five push-button speed switches 24 which determine the particular chart speed for any speed range; the latensifier lamps 31 which are provided to intensify the latent images produced on the length of paper which has been exposed to radiation in the instrument; the on-off switch 2S9 which is provided to control the energization of the latensifier lamp 31; and the start switch 2S18 which is provided to start the latensifier lamps 31.

FIGURE 19 also illustrates the energizing circuit for the several drive, braking, take-up and other clutches associated with the drive motor 3B1.

Figure 20A:
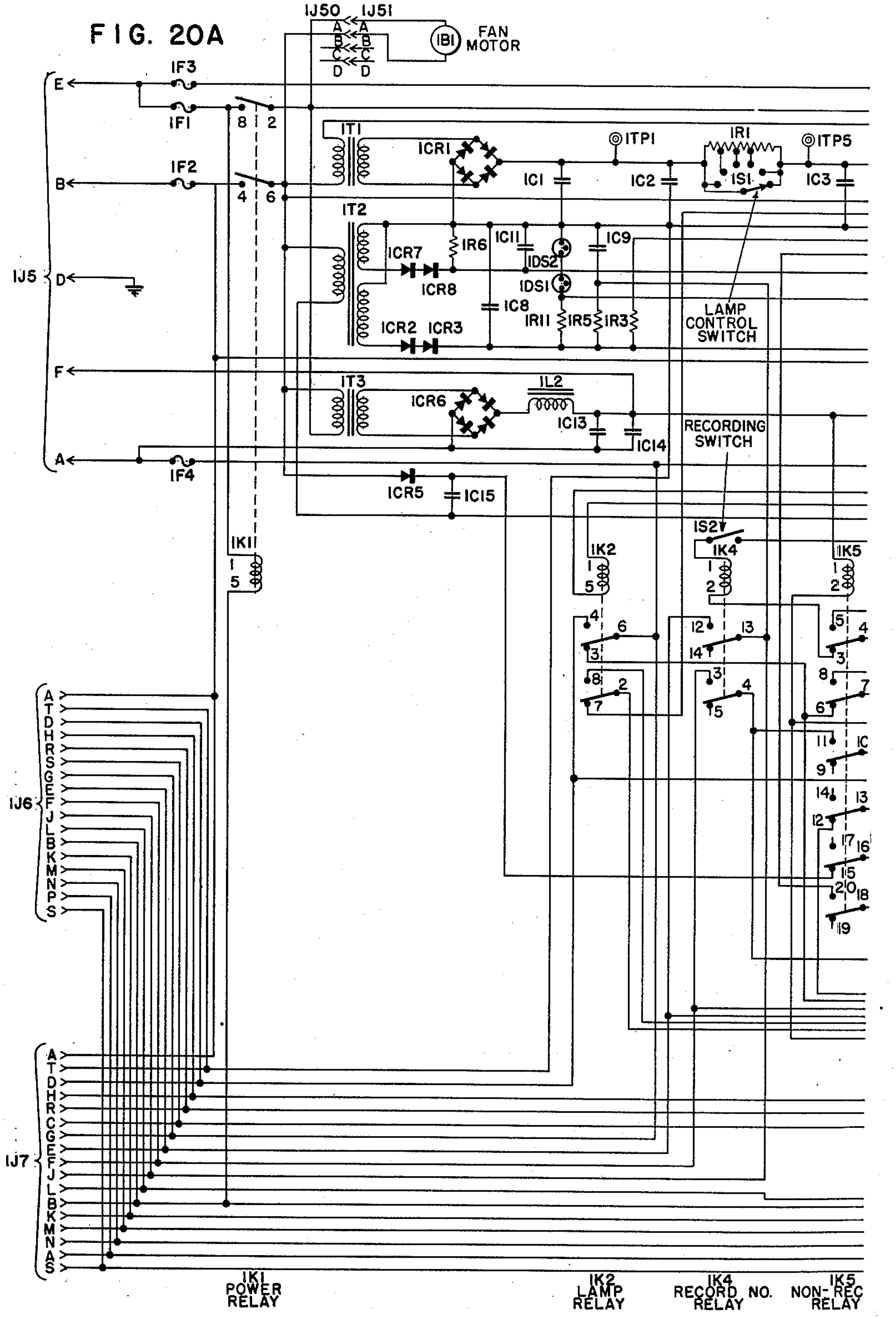
Figure 20B:
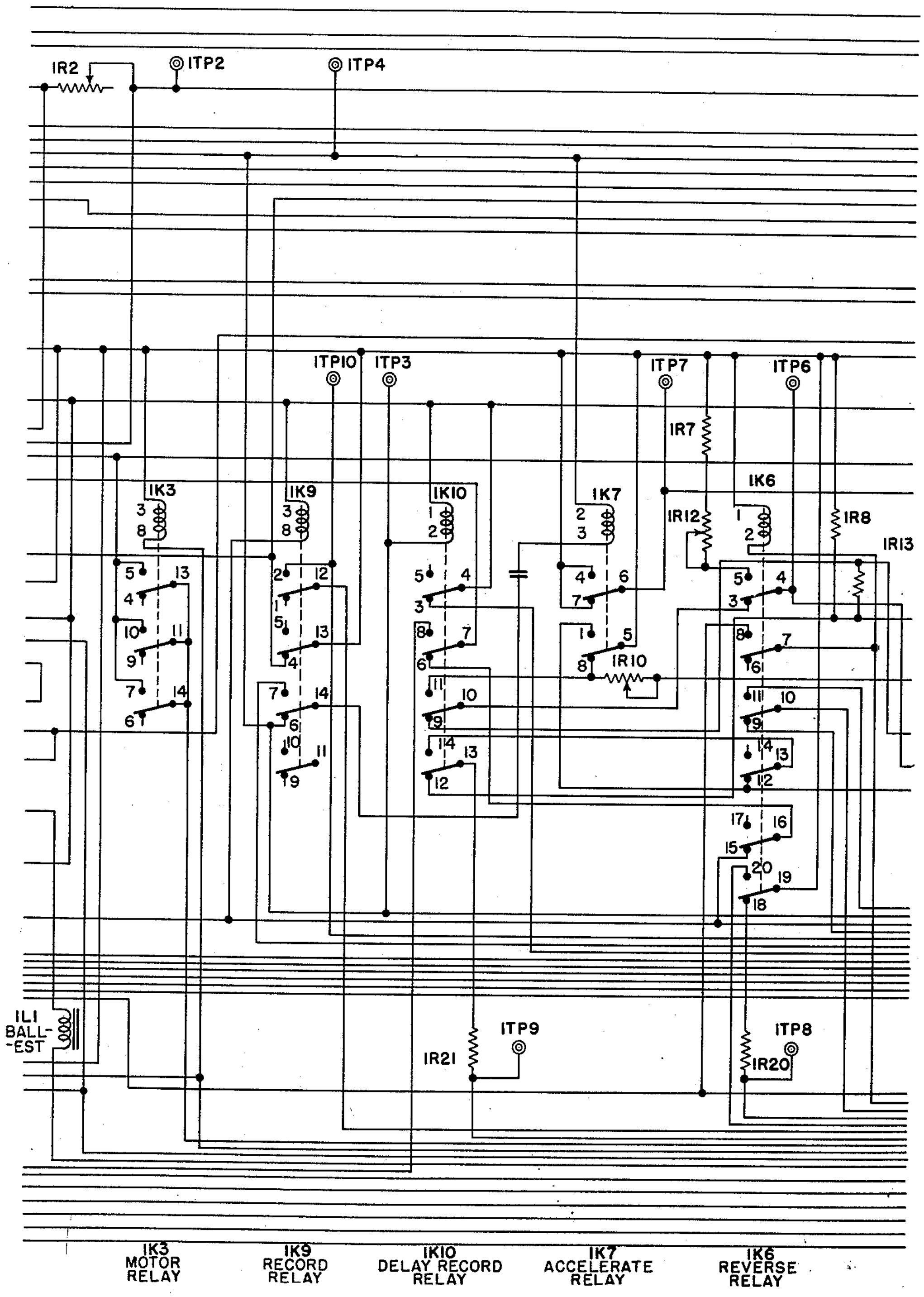
Figure 20C:
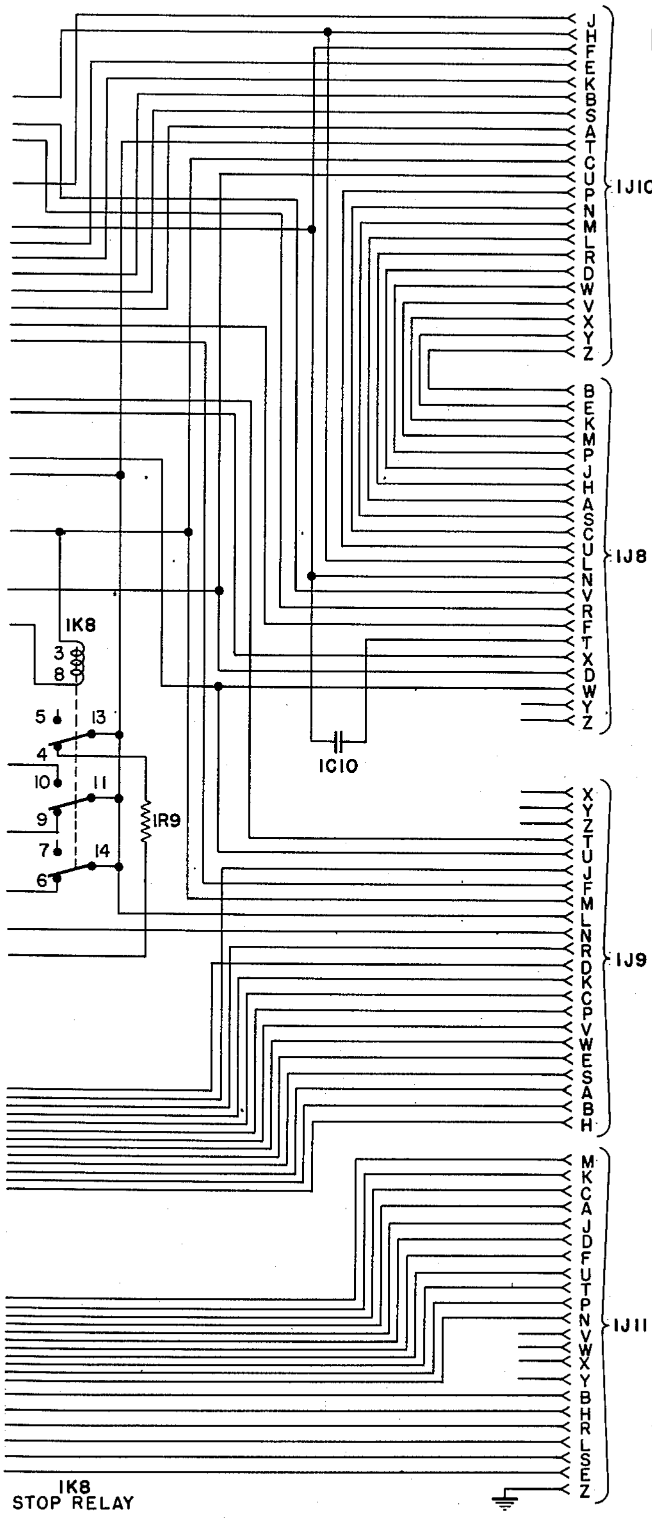
Figure 20:
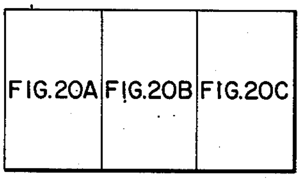

FIGURE 20 shows the power supply circuitry for the oscillographic recording instrument, and shows the detailed connections for such circuit components as the fan motor 1B1, the non-recording relay 1K5, the recording relays 1K9 and 1K10, the lamp relay 1K2, and the D.C. power supplies for the various relay circuits.

The power supply circuitry of FIGURE 20 is interconnected with the circuitry of FIG. 19 by means of jacks 1J8, 1J9 of FIG. 20C and 2J11, respectively, of FIGURE 19A.

FIGURE 21 shows the remote control and indicating means which is adapted for connection to the circuit of FIGURE 20 through jacks 1J6 and 1J7.

FIGURE 22 is a schematic diagram showing the energizing circuitry for the Osram recording lamp 101 and also for the cooling fan motor 4B1, in addition to the aforementioned galvanometer bank heaters 4HR1 and 4HR2. The circuit of FIGURE 22 is adapted to be connected to the circuitry of FIGURE 20 by means of the jack 4J10, and the jack 1J10 of FIGURE 20.

FIGURE 23 is a schematic illustration of a typical circuit of each of the numerous galvanometers contained within the several galvanometer banks embodied within the oscillographic recording instrument.

It should be readily apparent from the foregoing description that applicant has provided a novel method of and apparatus for producing an image or trace of phenomena occurring at either low or high frequency and which is made immediately visible and usable in full view and under control of the operator. This oscillographic record, moreover, is characterized by its inherent freedom from inaccuracies and undesirable effects tending to result from changes in existing ambient conditions.

What is claimed is:

1. In an oscillograph for recording the variations with time of the value of a phenomenon under observation, a source of a beam of radiant energy, means for moving at least a portion of said beam spaced from said source in a path so that the position of at least one transverse cross section of said beam corresponds to the value of the phenomenon under observation, means for moving sensitized paper in one direction across said beam and at an angle to said path whereby said transverse cross section of said beam makes a record on said paper of the variations of the value of said phenomenon, an electric lamp located in the path of radiant energy from said source and containing gas which is ionized when radiant energy from said source falls on it, means repetitively supplying to said electric lamp electricity of sufficient voltage and current to cause said electric lamp to emit a flash of radiant energy when said gas is ionized by said radiant energy from said source, and an optical system of mirrors and lenses directing said flashes of radiant energy onto said paper and thereby to produce time lines on said paper.

2. In an oscillograph for recording the variations with time of a phenomenon under observation, a source of a beam of radiant energy, means for moving at least a portion of said beam spaced from said source in a path so that the position of at least one transverse cross section of said beam corresponds to the value of the phenomenon under observation, means for moving sensitized paper in one direction across said beam and at an angle to said path whereby said transverse cross section of said beam makes a record on said paper of the variations of the value of said phenomenon, an electric lamp containing gas which is ionized when radiant energy from said source falls on it, means directing radiant energy from said source to said electric lamp so as to ionize said gas, means repetitively supplying to said electric lamp electricity of sufficient voltage and current to cause said lamp to emit a flash of radiant energy when said gas is ionized by said radiant energy from said source, and an optical system of mirrors and lenses directing said flashes of radiant energy onto said paper and thereby to produce time lines on said paper.

3. In an oscillograph for recording the variations with time of phenomenon under observation, a source of a beam of radiant energy, means for moving at least a portion of said beam spaced from said source in a path so that the position of at least one transverse cross section of the beam corresponds to the value of the phenomenon under observation, means for moving sensitized paper in one direction across said beam and at an angle to said path whereby said transverse cross section of said beam makes a record on said paper of the variations of the value of said phenomenon, a mirror adapted to reflect radiant energy from said source, an electric lamp located in the path of said radiant energy reflected from said source by said mirror and containing gas which is ionized when radiant energy from said source falls on it, means for repetitively supplying electricity to the said electric lamp of sufficient voltage and current to cause said electric lamp to emit a flash of radiant energy when said gas is ionized by the radiant energy from said source, and an optical system of mirrors and lenses directing said flashes of radiant energy onto said paper and thereby to produce time lines on said paper.

4. In an oscillograph for recording the variations with time of a phenomenon under observation, a source of a beam of radiant energy, galvanometer having a coil responsive to the variations of said phenomenon, a galvanometer mirror movable with said coil to reflect said beam of radiant energy and cause it to move as a pointer with the movements of said coil, means for moving sensitized paper in one direction across said beam so that said beam impinges on said paper and makes a record of the variations of the value of said phenomenon thereon, and means for producing time lines on said paper including, an oscillator adapted to produce repetitive pulses of high current electricity, an electric lamp located in the path of radiant energy from said source and containing gas which is ionized when radiant energy from said source falls on it and adapted to emit a flash of radiant energy when said one of repetitive pulses of high current electricity is applied to it, and an optical system of mirrors and lenses directing said flashes of radiant energy under said paper and thereby to produce time lines on said paper.

5. In an oscillograph according to claim 4, an electric switch operative to select the time intervals at which the repetitive pulses of high current electricity are caused to flow through said electric lamp.

6. In an oscillograph for recording the variations with time of phenomena: a source of radiant energy, a film sensitive to radiant energy, a plurality of devices each responsive to the variations with time of one of said phenomena and connected in a separate one of a plurality of electric circuits and arranged in a plurality of groups, a plurality of device-mirrors each mounted on one of said devices to move therewith and arranged in groups in side-by-side relation, a plurality of light-control mirrors, one for each of said groups of devices, each mounted to receive radiant energy from said source and to reflect said radiant energy to each of said device-mirrors of the cooperating group in a direction normal to the line along which said device-mirrors are mounted and at an effective optical distance from said source to each device-mirror which is the same as the distance from the source to each of the other device-mirrors, and a recording-mirror for reflecting to said film the radiant energy reflected from each of said device-mirrors, whereby said radiant energy acts as visible pointers for producing immediately visible records on said film.

7. In an oscilloscope according to claim 6, a collector lens located between said source and each of said light-control mirrors to concentrate the light from said source onto each of said mirrors.

8. A process of recording on paper a record representing the variation of time with a phenomenon, including: forming radiant energy into a beam of small cross section, detecting the variations of said phenomenon and translating said variations into a variable force, moving at least a portion of said beam of radiant energy in response to the variations of said force along a path so that the position of one transverse cross-section of said beam indicates the value of the phenomenon under observation, moving sensitized paper and said beam relative to each other so that said path lies on the surface of said paper and said beam produces a record on the paper of the variations of said phenomenon, shielding said paper from radiant energy other than that of said beam during said recording, moving said paper from said shielded location and exposing said paper to radiant energy other than that of said beam, and of significantly less intensity than said beam, and moving said paper in the reverse direction from the location at which said paper is exposed to radiant energy other than that of said beam to the location at which said paper is shielded from radiant energy other than that of said beam.

9. A process of recording on sensitized paper a record representing the variations with time of a phenomenon, including: forming radiant energy into a beam of small cross-section, detecting the variations of said phenomenon and translating said variations into a variable force, deflecting at least a portion of said beam in response to the variations in said force and moving one transverse cross section of said beam along a path so that its position indicates the value of the phenomenon under observation, said radiant energy having a band of frequency to which the recording paper is most sensitive, moving recording paper which is most sensitive to the band of frequencies of said radiant energy in one direction at a constant speed across said beam at an angle to the path of said beam so that the path of said beam lies on said paper and said beam produces a record on said paper of the variations of said phenomenon, shielding said recording paper from radiant energy other than that of said beam during said recording, moving said recording paper from the location at which said recording paper is shielded from radiant energy other than that of said beam and exposing said recording paper to radiant energy other than that of said beam and of significantly less intensity than said beam, and moving said recording paper in the opposite direction from said location where said recording paper is exposed to radiant energy other than that of said beam to said location where said recording paper is shielded from radiant energy other than that of said beam.

10. A process of recording on sensitized paper a record representing the variations with time of a phenomenon, including: forming radiant energy into a beam of small cross-section, detecting the variations of said phenomenon and translating said variations into a variable force, deflecting at least a portion of said beam in response to the variations in said force so that one transverse cross-section of said beam moves along a path so that the position of said cross-section indicates the value of the phenomenon under observation, moving sensitized paper in one direction at a constant speed across said beam at an angle to the path of said beam so that the path of said beam lies on the surface of said paper and produces a record on said paper, shielding said sensitized paper from radiant energy other than that of said beam during said recording, forming a second source of radiant energy, moving said sensitized paper in the opposite direction in the absence of said beam and exposing said paper to radiant energy from said second source and of significantly less intensity than said beam while said paper is moving in the opposite direction to latensify the record on said paper.

11. A process of recording on paper records representing the variations with time of phenomena, including: forming radiant energy into a plurality of beams each of small cross section, detecting the variation of said phenomena and translating said variations into a plurality of variable forces, moving at least a portion of each of said beams of radiant energy in response to the variation of one of said forces along a path so that the position of one transverse cross section of said beam indicates the value of the phenomenon, moving sensitized paper and said beams relative to each other so that said paths lie on the surface of said paper and said beams produce records on the paper of the variations of said phenomena, shielding said paper from radiant energy other than that of said beams during said recording, moving said paper from said shielded location and exposing said paper to radiant energy other than that of said beams and of significantly less intensity than said beam, and moving said paper in the reverse direction from the location in which said paper exposed to radiant energy other than that of said beams to the location in which said paper is shielded from radiant energy other than that of said beams.

12. A process of recording on sensitized paper records representing the variations with time of phenomena, including: forming radiant energy into a plurality of beams each of small cross section, detecting the variations of said phenomena and translating said variations into a plurality of variable forces, deflecting at least a portion of each of said beams in response to the variation in one transverse of said forces and moving one cross-section of each of said beams along a path so that its position represents the value of the phenomenon, said radiant energy having a band of frequencies to which the recording paper is most sensitive, moving recording paper which is most sensitive to the band of frequencies of said radiant energy in one direction at a constant speed across said beams at an angle to the paths of said beams so that the paths of said beams lie on said paper and said beams produce records on said paper the variations of said phenomena, shielding said recording paper from radiant energy other than that of said beams during said recording, moving said recording paper from the location at which said recording papers is shielded from said radiant energy other than that of said beams and exposing said recording paper to radiant energy other than that of said beams, and of significantly less intensity than said beam, moving said recording paper in the opposite direction from said location where said recording paper is exposed to radiant energy other than that of said beams, and moving said recording paper in the opposite direction from said location where said recording pape is exposed to radiant energy other than that of said beams to said location where said recording paper is shielded from radiant energy other than that of said beams.

13. A process of recording on sensitized paper records representing the variations with time of phenomena, including: forming radiant energy into a plurality of beams each of small cross section, detecting the variations of said phenomena and translating said variations into a plurality of variable forces, deflecting at least a portion of each of said beams in response to the variation in one transverse of said forces so that one cross section of said beam moves along a path so that the position of said cross-section indicates the value of the phenomenon, moving sensitized paper in one direction in a constant speed across said beams at an angle to the paths of said beams so that the paths of said beams lie on the surface of said paper and produce records on said paper, shielding said sensitized paper from radiant energy other than that of said beams during said recording, forming a second source of radiant energy, and moving said sensitized paper in the opposite direction in the absence of said beams and exposing said paper to radiant energy from said second source of significantly less intensity than said beam while said paper is moving in the opposite direction to latensify the records on said paper.

14. In an oscillograph for recording the variations with time of phenomena: a source of radiant energy, a film sensitive to radiant energy, a plurality of devices each responsive to the variations with time of one of said phenomena and connected into a separate one of a plurality of electric circuits and mounted in a line, a plurality of device-mirrors each mounted on a separate one of said devices to move therewith, a light-control mirror mounted to receive radiant energy from said source and to reflect radiant energy to each of said device-mirrors in a direction normal to the line along which said device-mirrors are mounted and at an effective optical distance from said source to each device-mirror which is the same as the distance from the source to each of the other device-mirrors, a recording-mirror for reflecting to said film the radiant energy reflected from each of said device-mirrors, whereby said radiant energy acts as invisible pointers for producing immediately visible records on said film, a second source of radiant energy, means to cause said second source of radiant energy to emit beams of radiant energy intermittently, said intermittent beams of radiant energy being directed to said recording-mirror which reflects said beams to said film simultaneously with the radiant energy reflected from said device-mirrors, whereby said radiant energy acts as invisible pointers for producing immediately visible time lines on said film at an angle to the directional movement of said film.

15. In an oscilloscope according to claim 14, a plurality of time line mirrors located between said second source of radiant energy and said recording-mirror to direct the beams of radiant energy from said second source of radiant energy to said recording-mirror.

16. In an oscilloscope according to claim 14, lenses located between said second source of radiant energy and said recording-mirror and adapted to concentrate the beams of radiant energy from said second source of radiant energy onto said recording-mirror.

17. In an oscillograph for recording the variations with time of a phenomenon: a case having an opening through the wall thereof, a supply roll mounted in said case, a take-up roll mounted in said case, a film sensitive to radiant energy mounted on said supply roll and on said take-up roll and movable past the opening in said case so as to be exposed to ambient radiant energy entering said case through said opening, a source of radiant energy in said case and of significantly greater intensity than said ambient radiant energy, a galvanometer in said case having a mirror mounted to move with the variations with time of said phenomenon and to reflect energy from said source as an invisible pointer to said film for producing immediately visible records thereon at a location in said case shielded from said ambient radiant energy, and a reversible electric motor connected to said supply roll and to said take-up roll and operable to move said film either from or to said supply roll and either to or from said take-up roll to permit records to be made on said film at a location within said case shielded from ambient radiant energy and to expose to ambient radiant energy those portions of said film on which said records are.

18. In an oscillograph according to claim 17, means for varying the speed at which said electric motor drives said film.

19. In an oscillograph for recording the variations with time of the value of a phenomenon under observation, a case having an opening through the wall thereof, a source of a beam of radiant energy in said case, means in said case deflecting said beam and impinging said beam in a spot on said sensitized paper and moving said spot across said sensitized paper in a path at an angle to the direction of movement of said paper, whereby said beam makes a record on said paper of the variation of the value of said phenomenon at a location in said case which is shielded from ambient radiant energy of significantly less intensity than said beam, and for moving said sensitized paper in said one direction past said opening through said case so as to receive ambient energy thereon through the opening in said case, said means for moving said sensitized paper being also operable to move said sensitized paper in the opposite direction, so as to return said sensitized paper to a location within said case shielded from the ambient radiant energy, and means for shielding said sensitized paper from said beam of radiant energy when it is desired not to make a record.

20. In an oscillograph for recording the time-variations of phenomena under observation, means for identifying the records formed by the oscillograph, including, a single source of radiant energy, means for forming said radiant energy into a plurality of beams and moving each of said beams along a path so that its position indicates the value of one of the related phenomena under observation, a rod arranged to traverse a forward path in a substantially straight line transversely of said source and of each of said means and relatively spaced from said source and from said means and adapted to interrupt in succession the radiant energy from said source to each of said means so as to cause an interruption in the beam of light reflected from said means and to traverse a reverse path not transversely of said source and any of said means and connected at its ends to the ends of said forward path, a single endless belt on which said rod is mounted, means spaced apart from each other to support said endless belt and said rod carried thereby, means for moving said endless belt at a substantially constant speed, and means for moving sensitized paper in one direction and at a substantially constant speed across said beams and at an angle to the path of said beams to produce a plurality of records on said paper.

21. In an oscillograph for recording the variations with time of phenomena on paper sensitive to radiant energy: a source of radiant energy, a plurality of devices each responsive to the variations with time of one of said phenomena and connected in a separate one of a plurality of electric circuits and arranged in a plurality of groups, a plurality of device-mirrors each mounted on one of said devices to move therewith and arranged in groups in side-by-side relation, a plurality of light-control mirrors, one for each of said groups of devices, each mounted to receive radiant energy from said source and to reflect said radiant energy to each of said device-mirrors in a cooperating group in a direction normal to the line along which said device-mirrors are mounted and at effective optical distance from said source to each device-mirror which is the same as the distance from the source to each of the other device-mirrors, and means for identifying the records formed by the oscillograph, including, at least one rod located between said light-control mirrors and said groups of device-mirrors and relatively spaced from said source and from said device-mirrors and movable between said light-control mirrors and said device-mirrors for interrupting the radiant energy from said source to each of said device-mirrors in succession so as to cause an interruption in the beam of light emitted by said device-mirror, an endless belt on which said rod is mounted, and means for moving said endless belt at a constant speed.

References Cited in the file of this patent

UNITED STATES PATENTS

| | | |
|---|---|---|
| 1,056,878 | Aspinwall et al. | Mar. 25, 1913 |
| 1,596,758 | Mutscheller | Aug. 17, 1926 |
| 1,672,894 | Legg | June 12, 1928 |
| 1,794,966 | Legg | Mar. 3, 1931 |
| 1,812,083 | Damerell | June 30, 1931 |
| 1,843,572 | MacGahan | Feb. 2, 1932 |
| 1,867,176 | Rieckmann | July 12, 1932 |
| 2,269,414 | Woods | Jan. 6, 1942 |
| 2,366,194 | Kaiser | Jan. 2, 1945 |
| 2,415,879 | Hassler | Feb. 18, 1947 |
| 2,438,341 | Kizaur | Mar. 23, 1948 |
| 2,496,392 | Hasbrook | Feb. 7, 1950 |
| 2,535,065 | Heiland | Dec. 26, 1950 |
| 2,580,427 | Heiland | Jan. 1, 1952 |
| 2,582,793 | Perry | Jan. 15, 1952 |
| 2,626,004 | Hasbrook | Jan. 20, 1953 |
| 2,635,034 | Haviland | Apr. 14, 1953 |
| 2,697,648 | Kerr et al. | Dec. 21, 1954 |
| 2,707,524 | Montgomery | May 3, 1955 |
| 2,746,833 | Jackson | May 22, 1956 |
| 2,765,211 | Brinster et al. | Oct. 2, 1956 |
| 2,796,317 | Valenti et al. | June 18, 1957 |
| 2,845,615 | Bowman | July 29, 1958 |
| 2,857,273 | Landow | Oct. 21, 1958 |
| 2,868,064 | Henkel | Jan. 13, 1959 |
| 2,929,669 | Madeley et al. | Mar. 22, 1960 |
| 2,985,499 | Riblet | May 23, 1961 |

FOREIGN PATENTS

| | | |
|---|---|---|
| 633,079 | Great Britain | Dec. 12, 1949 |

OTHER REFERENCES

Mees: "The Theory of the Photographic Process," pages 262–275.

Disclaimer 3,066,299.—*Richard S. Kampf*, Denver, Colo. RECORDER. Patent dated Nov. 27, 1962. Disclaimer filed Feb. 28, 1966, by the assignee, *Honeywell Inc.*

Hereby enters this disclaimer to claims 20 and 21 of said patent.

[*Official Gazette April 5, 1966*]

Disclaimer 3,066,299.—*Richard S. Kampf*, Denver, Colo. RECORDER. Patent dated Nov. 27, 1962. Disclaimer filed Apr. 28, 1966, by the assignee, *Honeywell Inc.*

Hereby enters this disclaimer to claims 1–7 and 14–16 of said patent.

[*Official Gazette July 12, 1966.*]